US 6,570,566 B1

(12) United States Patent
Yoshigahara

(10) Patent No.: US 6,570,566 B1
(45) Date of Patent: May 27, 2003

(54) IMAGE PROCESSING APPARATUS, IMAGE PROCESSING METHOD, AND PROGRAM PROVIDING MEDIUM

(75) Inventor: Takayuki Yoshigahara, Tokyo (JP)

(73) Assignee: Sony Corporation, Tokyo (JP)

( * ) Notice: Subject to any disclaimer, the term of this patent is extended or adjusted under 35 U.S.C. 154(b) by 314 days.

(21) Appl. No.: 09/591,448

(22) Filed: Jun. 9, 2000

(30) Foreign Application Priority Data

Jun. 10, 1999 (JP) .......................................... 11-163799

(51) Int. Cl.$^7$ ............................................. G06T 15/20
(52) U.S. Cl. ............................... 345/427; 345/7; 345/8; 345/9; 348/42; 348/47; 359/234; 359/17
(58) Field of Search ................................ 345/7, 8, 427, 345/9, 419; 348/42, 47; 359/234, 17, 462

(56) References Cited

U.S. PATENT DOCUMENTS 5,351,152 A * 9/1994 Kuo et al. .................. 359/234
5,801,760 A * 9/1998 Uomori ........................ 348/47
6,111,597 A * 8/2000 Tabata ............................ 345/8
6,388,639 B1 * 5/2002 Hoshino et al. ................ 345/7

* cited by examiner

Primary Examiner—Almis R. Jankus
Assistant Examiner—Kimbinh T. Nguyen
(74) Attorney, Agent, or Firm—Bell, Boyd, & Lloyd LLC

(57) ABSTRACT

An image displaying configuration is arranged so that objects and scenes at the distance of the fixation point are images in focus, and objects and scenes at distances other than the distance of the fixation point are subjected to out-of-focus processing according to the distance from the fixation point, based on the fixation point position information for both right and left eyes, and based on the distance information of the shown image, whereby an image is shown. This configuration allows three-dimensional images with a sensation closer to real space to be shown, thus providing for an image processing apparatus and image processing method capable of three-dimensional images with increased sensations of reality.

33 Claims, 13 Drawing Sheets

IMAGE PROCESSING APPARATUS, IMAGE PROCESSING METHOD, AND PROGRAM PROVIDING MEDIUM

BACKGROUND OF THE INVENTION

1. Field of the Invention

The present invention relates to an image processing apparatus and image processing method, and particularly relates to an image processing apparatus and image processing method capable of showing three-dimensional images of a sensation closer to observations made in actual space with a system which provides three-dimension information images such as with computer graphics and the like, and more specifically relates to an image processing apparatus and image processing method capable of performing control so as to generate and show three-dimensional images of a sensation closer to observations made in actual space by means of showing images in focus and images not focused, i.e., images with out-of-focus generated, according to the point-of-view position information of the user.

2. Description of the Related Art

As a technique for showing three-dimensional images, there is a method wherein two images provided with parallax of the left and right eyes are generated, and shown to the respective left and right eyes. For example, an arrangement wherein objects and scenes in images are made to be viewed in a three-dimensional manner, by means of showing two images generated taking the parallax of the left and right eyes into consideration to the left and right eyes of a user wearing an HMD (Head Mounted Display) is in practical use.

Multiple conventional examples for showing three-dimensional images taking the parallax of the left and right eyes into consideration will be described with reference to FIGS. 1A–1C. FIG. 1A is an example primarily widely applied in the fields of video conferencing and remote-controlled robot vision, and is used to show the state of remote areas to a user in a three-dimensional manner, for example. As shown in FIG. 1A, the same object is simultaneously imaged with two cameras 101 and 102 regarding which the positional relation has been fixed. For example, the optical axes are positioned parallel and the same object or scene is taken by each, so that individual images for each are taken. The positional relation of the two cameras 101 and 102 is determined taking parallax into consideration, with the camera 101 taking images for the left eye, and the camera 102 taking images for the right eye. The images taken by each camera are displayed on two image display units, i.e., a left eye image display unit L 103 and a right eye image display unit R 104, and the user observes the image taken with camera 101 with the left eye and the image taken with camera 102 with the right eye, and thus can experience a three-dimensional sensation as if the user were actually viewing the object or scene with naked eyes.

FIG. 1B is an example of application in a field called VR (Virtual Reality) or MR (Mixed Reality), and is a configuration wherein a three-dimensional space created within a calculator can be shown to a user in a virtual manner, or the computer-synthesized three-dimensional image can be superimposed over a real-space image taken by the system shown in FIG. 1B. Three-dimensional information defining a scene or object defined in a virtual three-dimensional space within the calculator is stored within the three-dimensional information storing unit 105 shown in FIG. 1B, and a left eye image and right eye image are generated in the parallax image generating unit 106, based on this three-dimensional information. The left eye image and right eye image generated in the parallax image generating unit 106 are each two different sets of image data generate based on the stored information in the three-dimensional information storing unit 105, assuming that a virtual object for example is observed from respective visual line directions. The left eye image and right eye image are displayed on the two image display units, i.e., a left eye image display unit L 107 and a right eye image display unit R 108, and can be viewed by the user as a virtual reality (VR) image as a virtual three-dimensional image on a three-dimensional space created within the calculator, or as a mixed reality (MR) image synthesized with a real-space image taken with a camera or the like. Regarding the MR techniques, in addition to that using an image taken by a camera as described above, there is a configuration called "see-through" type wherein a virtual object is superimposed on a world which the user is directly viewing, using a half-mirror or the like (e.g., "Technique for Positioning Real Worlds and Virtual Worlds", Kiyohide Sato, Image Recognition and Understanding Symposium, July 1998).

FIG. 1C is a technique used in 3D movies, and is a configuration wherein image data is prepared separately as left eye images and right eye images beforehand, stored in an image storing unit L 109 and image storing unit R 110, and synthesized to be displayed on an image display unit L 111 and an image display unit R 112.

The examples shown in FIGS. 1A–1C are configurations for showing three-dimensional images by displaying images separately for left and right eyes, but there are also methods for realizing displaying of three-dimensional images without having two image display units, i.e., with only one image display unit. This includes a method wherein the user wears glasses wherein the polarized plane of incident light to the left and right eyes becomes perpendicular, the images to be shown to the left and right eyes respectively are polarized and displayed, so as to observe images with the left and right eyes from respective points of view, a method wherein the user wears glasses capable of transmitting or shielding incident light to the left and right eyes by using liquid crystal shutters or the like, and alternately displaying images to be shown to the left and right eyes respectively in time-sequence at high speed, so as to observe images with the left and right eyes from respective points of view, and so forth.

The above conventional art represents a three-dimensional sensation by individually showing to the left and right eyes of the user two sets of image data taking parallax of the left and right eyes into consideration. However, parallax is not the only information necessary for humans to obtain a three-dimensional sensation. In the event of humans viewing an actual three-dimensional space, the eyes focus on an object at a fixation point by adjusting the thickness of the crystalline lens which serves as the lens of the eye. Thus all objects except that at the point of fixation are out of focus according to the distance thereof from the object at the fixation point, and these appear to the human eye as fuzzy or out-of-focus images. This fuzzy focus has not been taken into consideration in conventional three-dimensional image showing apparatuses, with the outline of almost all object images contained within the area image at differing distances from the fixation point being displayed clearly, giving the user viewing the images an unnatural sensation.

Thus, many conventional three-dimensional image showing apparatuses show the outline of objects contained within the area other than the fixation point at differing distances from the fixation point as clearly as that of the object at the fixation point. Accordingly, a great number of images regarding which the user is not focused upon, i.e., at positions other than the fixation point, are observed by the user with clear outlines. Such a configuration not only gives the user viewing the three-dimensional images an unnatural sensation, but also is burdensome for the eyes of the user and has been a cause of increased fatigue for the user.

SUMMARY OF THE INVENTION

The present invention has been made in light of such conventional art, and accordingly, it is an object thereof to provide an image processing apparatus, image processing method, and program providing medium, wherein three-dimensional images closer to real space can be shown to the user, by means of obtaining the fixation point position of the user observing three-dimensional images, generating out-of-focus for images which are at areas other than the fixation point in the displayed image, according to distance from the objects and scenes which are the fixation point components, and forming this into the image shown to the user.

Further, it is another object of the present invention to provide an image processing apparatus, image processing method, and program providing medium, wherein the fixation point position of the user is obtained and the image which is the object of the fixation point is brought into focus, out-of-focus is generated for images at areas other than the fixation point contained in the displayed image according to distance from the objects and scenes which are the fixation point image, and this is formed this into the displayed image shown to the user, thus enabling a state wherein the image formed on the retinas of the user approximates the state of viewing an object in real three-dimensional space with naked eyes, whereby the user observing the three-dimensional images does not experience an unnatural sensation, nor is it burdensome for the eyes but rather lessens fatigue.

The present invention has been made taking the above problems into account, and according to a first aspect of the present invention, an image processing apparatus which executes three-dimensional image generation processing comprises:

fixation point obtaining means for obtaining a fixation point position on an image display means; and out-of-focus image generating means for generating an out-of-focus image based on three-dimensional information relating to a displayed image on the image display means;

wherein the out-of-focus image generating means takes the distance from the point of view of the display component contained in the pixel position corresponding to the fixation point position at the image display means as the standard distance;

and wherein the image processing apparatus has a configuration in which out-of-focus image generation processing is performed regarding display components on the image display means at which the difference with the standard distance exceeds a predetermined threshold value.

The out-of-focus image generation processing at the out-of-focus image generating means may be executed as different out-of-focus image generation processing depending on the distance difference which is the difference with the standard distance. Further the out-of-focus image generation processing may be performed by the out-of-focus image generating means by changing the luminance of pixels in a surrounding area containing an arbitrary pixel "i" based on the difference between the arbitrary pixel "i" and the standard distance, i.e., based on R(is)–R(i), wherein "is" represents the pixel position of the fixation point on the image display means obtained by the fixation point obtaining means, R(is) represents the standard distance which is the distance from the point of view of the pixel position "is" obtained based on the three-dimensional information, and R(i) represents the distance from the point of view of the arbitrary pixel "i" on the image display means.

Further, the image processing apparatus may have a configuration wherein the out-of-focus image generating means obtains the out-of-focus amount z(i) at the pixel "i" on the display means by the following Expression 7;

Expression 7

$$\zeta(i) = \frac{R(is) - R(i)}{R(is)}$$

wherein

"is" represents the pixel position on the image display means obtained by the fixation point obtaining means, R(is) represents the standard distance which is the distance from the point of view of the pixel position "is" obtained based on the three-dimensional information, and R(i) represents the distance from the point of view of the arbitrary pixel "i" on the display means;

and wherein the radius r(i) of the area W stipulated with the pixel "i" as the center is obtained using an arbitrarily settable parameter "a" with the following Expression 8;

Expression 8

$$r(i) = a \cdot \zeta(i)$$

and wherein the luminance value B(i) following the out-of-focus image generation processing is obtained by the following Expression 9;

Expression 9

$$B(i) = \frac{\sum_{j \in w} I(j)}{N}$$

wherein j represents the pixels contained in the area W,

N represents the number of pixels contained in the area W, and

I(i) represents the original luminance value at the pixel "i";

thus executing processing for determining the luminance value B(i) as the luminance value of the pixel "i".

The image processing apparatus may comprise:

first image display means for displaying a left-eye image according to parallax, and second image display means for displaying a right-eye image according to parallax; and fixation point obtaining means for obtaining a left-eye fixation point position on the first image display means and a right-eye fixation point position on the second image display means;

wherein the out-of-focus image generating means has a configuration for generating an out-of-focus image based on the three-dimensional information relating to the display image at the first image display means and the second image display means, and taking the distance from the point of view of the display component at the position corresponding to the fixation point position for the left eye at the first image display means as the left eye image standard distance and subjects the displayed image on the first image display means to out-of-focus image generation processing according to the difference between the left eye image and the standard distance, and the distance from the point of view of the display component at the position corresponding to the fixation point position for the right eye at the second image display means as the right eye image standard distance and subjects the displayed image on the second image display means to out-of-focus image generation processing according to the difference between the right eye image and the standard distance.

Here, first imaging means for taking visual line images from the visual line of the left eye and second imaging means for taking visual line images from the visual line of the right eye may comprise multiple imaging means for taking images according to parallax. Also, three-dimensional information generating means may be provided to generate three-dimensional information relating to the displayed images on the first image display means and the second image display means, based on multiple images taken by the first imaging means and the second imaging means. Further, three-dimensional information storing means may be provided for storing three-dimensional information relating to the displayed images on the first image display means and the second image display means;

wherein the out-of-focus image generating means has a configuration for executing out-of-focus image generating processing based on the three-dimensional information stored in the three-dimensional information storing means and fixation point information obtained by the fixation point obtaining means.

Further, parallax image generating means may be provided for generating two different parallax images to provide to the first image display means and the second image display means, based on the stored information in the three-dimensional information storing means;

wherein the out-of-focus image generating means has a configuration for executing out-of-focus image generating processing regarding parallax images generated by the parallax image generating means, based on the three-dimensional information stored in the three-dimensional information storing means and fixation point information obtained by the fixation point obtaining means.

Further, image storing means may be provided for storing images corresponding to each of the left and right point of view positions.

Moreover, the image display means may comprise a single image display means;

the fixation point obtaining unit may have a configuration for obtaining the fixation point average of both left and right eyes, or the fixation point of either the left or right eye, as the fixation point information;

and the out-of focus image generating means may be arranged so as to determine the distance from the point of view of the display component at the position indicated by the fixation point information received from the fixation point obtaining unit as the standard distance, and also subject the displayed image at the image display means to out-of focus image generating processing according to the difference from the standard distance, based on three-dimensional information regarding the displayed image at the image display means.

Three-dimensional information obtaining means may be provided for obtaining three-dimensional information, wherein the out-of-focus image generating means has a configuration for generating out-of-focus images using the three-dimensional information obtained from the three-dimensional information obtaining means.

Also, three-dimensional information storing means may be provided for storing three-dimensional information relating to displayed images on the single image display means, wherein the out-of-focus image generating means has a configuration for executing out-of-focus image generating processing based on the three-dimensional information stored in the three-dimensional information storing means and fixation point information obtained by the fixation point obtaining means.

Further, image generating means may be provided for generating images based on the visual line direction relating to the single image display means, based on storing information of the three-dimensional information storing means; wherein the out-of-focus image generating means has a configuration for executing out-of-focus image generating processing regarding images generated by the image generating means, based on the three-dimensional information stored in the three-dimensional information storing means and fixation point information obtained by the fixation point obtaining means. Also, image storing means may be provided for storing source images to be provided to the single image display means.

Moreover, the three-dimensional information may be made up of three-dimensional information obtained by one of the following methods:

three-dimensional information obtained by applying the stereo method based on multiple image data taken by a standard camera and a reference camera for taking the same object from different visual line directions;

three-dimensional information obtained by the multi base line stereo method using multiple reference cameras;

three-dimensional information obtained by the light-section method with slit light;

three-dimensional information obtained by a method using moire; and three-dimensional information obtained by a distance measuring method according to pattern light irradiation.

Also, according to a second aspect of the present invention, an image processing method which executes three-dimensional image generation processing comprises:

a fixation point obtaining processing step for obtaining a fixation point position on an image display means; and an out-of-focus image generating step for generating an out-of-focus image based on three-dimensional information relating to displayed images on the image display means;

the out-of-focus image generating step comprising:

a step for taking the distance from the point of view of the display component at a position corresponding to the fixation point position at the image display means as the standard distance; and a step for performing the out-of-focus image generation processing regarding display components on the image display means at which the difference with the standard distance exceeds a predetermined threshold value.

The out-of-focus image generation processing in the out-of-focus image generating step may be executed as different out-of-focus image generation processing depending on the distance difference which is the difference with the standard distance.

Also, the out-of-focus image generating step may be performed by changing the luminance value of pixels in a surrounding area containing an arbitrary pixel "i" based on the difference between the arbitrary pixel "i" and the standard distance, i.e., based on R(is)–R(i), wherein "is" represents the pixel position of the fixation point on the image display means obtained in the fixation point obtaining step, R(is) represents the standard distance which is the distance from the point of view of the pixel position "is" obtained based on the three-dimensional information, and R(i) represents the distance from the point of view of the arbitrary pixel "i" on the image display means.

Further, the out-of-focus image generating step may obtain the out-of-focus amount z(i) at the pixel "i" on the display means by the following Expression 10;

Expression 10

$$\zeta(i) = \frac{R(is) - R(i)}{R(is)}$$

wherein

"is" represents the pixel position on the image display means obtained in the fixation point obtaining step, R(is) represents the standard distance which is the distance from the point of view of the pixel position "is" obtained based on the three-dimensional information, and R(i) represents the distance from the point of view of the arbitrary pixel "i";

and wherein the radius r(i) of the area W stipulated with the pixel "i" as the center is obtained using an arbitrarily settable parameter "a" with the following Expression 11;

Expression 11

$$r(i) = a\zeta(i)$$

and wherein the luminance value B(i) following the out-of-focus image generation processing is obtained by the following Expression 12;

Expression 12

$$B(i) = \frac{\sum_{j \in w} I(j)}{N}$$

wherein j represents the pixels contained in the area W,

N represents the number of pixels contained in the area W, and

I(i) represents the original luminance value at the pixel "i";

thus executing processing for determining the luminance value B(i) as the luminance value of the pixel "i".

A fixation point obtaining step may be provided for obtaining a left-eye fixation point position on a first image display means for displaying a left-eye image according to parallax, and for obtaining a right-eye fixation point position on a second image display means for displaying a right-eye image according to parallax;

the out-of-focus image generating step comprising:

a step for taking the distance from the point of view of the display component at the position corresponding to the fixation point position for the left eye at the first image display means as the standard distance for the left eye image;

a step for subjecting the displayed image on the first image display means to out-of-focus image generation processing according to the difference between the left eye image and the standard distance;

a step for taking the distance from the point of view of the display component at the position corresponding to the fixation point position for the right eye at the second image display means as the standard distance for the right eye image; and a step for subjecting the displayed image on the second image display means to out-of-focus image generation processing according to the difference between the right eye image and the standard distance.

Further provided may be a step for taking visual line images from the visual line of the left eye with a first imaging means, and for taking visual line images from the visual line of the right eye with a second imaging means; and a three-dimensional information generating step for generating three-dimensional information relating to the displayed images on the first image display means and the second image display means, based on multiple images taken by the first imaging means and the second imaging means.

The out-of-focus image generating step may execute out-of-focus image generating processing, based on the three-dimensional information stored in the three-dimensional information storing means storing three-dimensional information relating to the displayed image, at the first image display means and the second image display means, and fixation point information obtained in the fixation point obtaining step.

Also, a parallax image generating step may be provided for generating two different parallax images to provide to the first image display means and the second image display means, based on the stored information in the three-dimensional information storing means; wherein the out-of-focus image generating step executes out-of-focus image generating processing regarding parallax images generated in the parallax image generating step, based on the three-dimensional information stored in the three-dimensional information storing means and fixation point information obtained in the fixation point obtaining step.

Further, the image display means may comprise a single image display means;

wherein the fixation point obtaining step obtains the fixation point average value of both left and right eyes, or the fixation point of either the left or right eye, as the fixation point information;

and wherein the out-of focus image generating step comprises:

a step for determining the distance from the point of view of the display component at the position indicated by the fixation point information obtained in the fixation point obtaining step as the standard distance, based on three-dimensional information relating to the displayed image on the image display means;

and a step for subjecting the displayed image at the image display means to out-of focus image generating processing according to the difference from the standard distance.

Further provided may be a three-dimensional information obtaining step for obtaining three-dimensional information, wherein the out-of-focus image generating step generates out-of-focus images using the three-dimensional information obtained in the three-dimensional information obtaining step, and also provided may be an image generating step for generating images based on the visual line direction relating to the single image display means, based on storing information of the three-dimensional information storing means; wherein the out-of-focus image generating step executes out-of-focus image generating processing regarding images generated in the image generating step, based on the three-dimensional information stored in the three-dimensional information storing means and fixation point information obtained in the fixation point obtaining step.

Further, according to a third aspect of the present invention, a program providing medium which tangibly provides computer programs for performing processing on a computer system to execute three-dimensional image processing, comprises:

a fixation point obtaining step for obtaining a fixation point position on an image display means; and an out-of-focus image generating step for generating an out-of-focus image based on three-dimensional information relating to displayed images on the image display means;

the out-of-focus image generating step comprising:

a step for taking the distance from the point of view of the display component at the position corresponding to the fixation point position at the image display means as the standard distance; and a step for performing the out-of-focus image generation processing regarding display components on the image display means at which the difference with the standard distance exceeds a predetermined threshold value.

The program providing medium according to the third aspect of the present invention is a medium for providing computer programs in a computer-readable format to general-purpose computer systems capable of executing various types of program code, for example. The form of the medium is not particularly restricted, and may be storage mediums such as CDs, FDs, MOs, etc., or may be transfer mediums such as a network, and so forth.

Such a program providing medium defines the structural or functional cooperation relation between the computer program and the providing medium, for realizing the predetermined functions of the computer program on the computer system. In other words, installing the computer program into the computer system via the providing medium causes the cooperating action to be exhibited upon the computer system, thereby obtaining the same actions and advantages as with the first aspect of the present invention.

Further objects, characteristics and advantages of the present invention will become apparent from the detailed description of the later-described embodiments of the present invention and of the attached drawings.

DETAILED DESCRIPTION OF THE DRAWINGS

DETAILED DESCRIPTION OF THE PREFERRED EMBODIMENTS

With conventional three-dimensional image showing apparatuses such as described above, oftentimes almost all portions of the objects, scenes, etc., which are components contained in the image to be shown, are in focus, and the outline of almost all objects contained in the image are shown with clear outlines, even for objects with a different distance from the point of view. Also, even in cases where there are out-of-focus objects according to distance, the out-of-focus is fixed, and does not take into consideration the point of view of the user viewing the shown image.

Figure 1A:
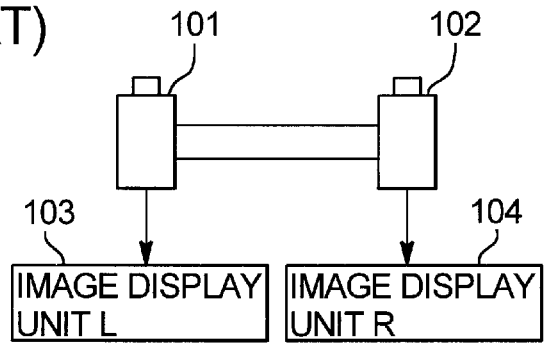
FIGS. 1A–1C are drawings illustrating various configuration examples of conventional three-dimensional image showing apparatuses using parallax images.
Figure 1B:
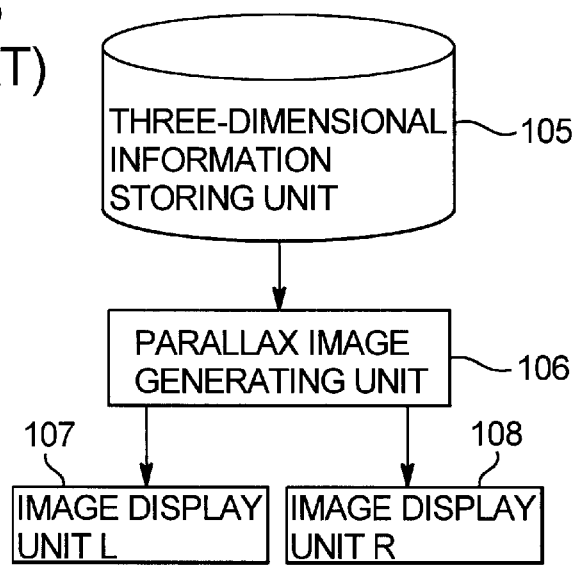
Figure 1C:
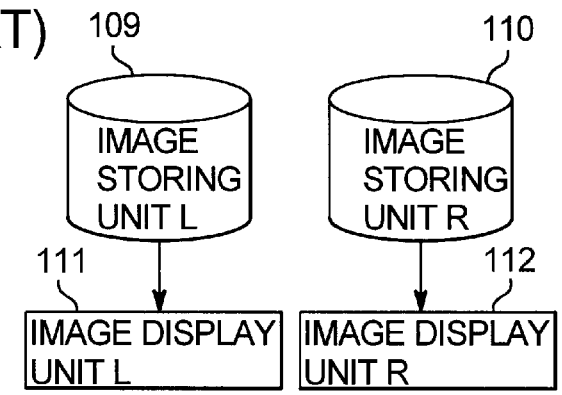
Figure 2A:
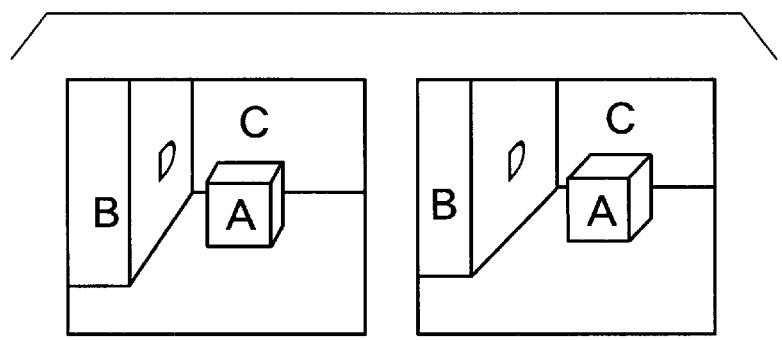
FIGS. 2A–2C are diagrams illustrating examples of a parallax image according to a conventional three-dimensional image showing apparatus, and of parallax images according to the image processing apparatus of the present invention.

First, the concept of the present invention will be described by showing the difference between the present invention and the conventional art, with reference to FIGS. 2A through 3. FIGS. 2A through 2C illustrate the left eye image and right eye image in configurations wherein two images having parallax for the left and right eyes are generated and the two images are shown to the left eye and right eye of the user as three-dimensional information by each of the shown methods.

Figure 2B:
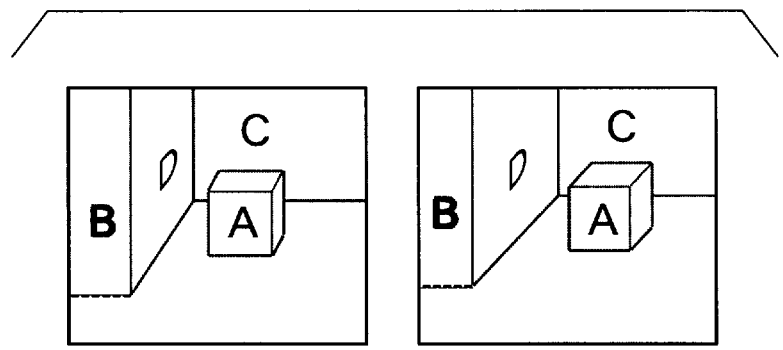
Figure 2C:
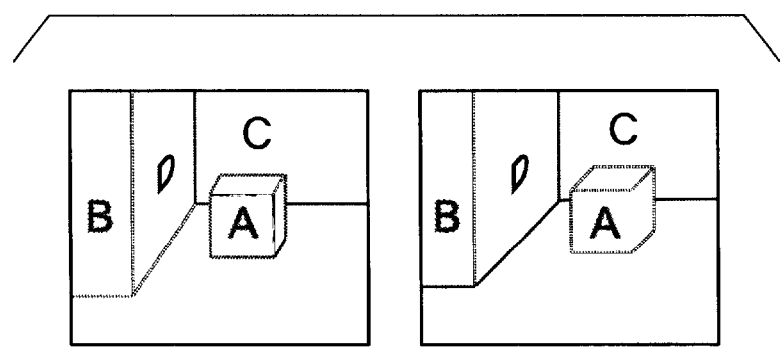

FIG. 2A is a display example of a conventional three-dimensional image showing apparatus, and FIGS. 2B and 2C are display examples with the image processing apparatus according to the present invention. The objects A through D and point of view shown in FIGS. 2A through 2C are in the spatial positional relation shown in FIG. 3. As shown in FIG. 3, the "plane of B" is a the position closest from the point of view, and at the farthest position is the "plane of C". The "plane of A" is in front of the "plane of C", and the "plane of D" is at a position connecting the "plane of B" and the "plane of C".

Figure 3:
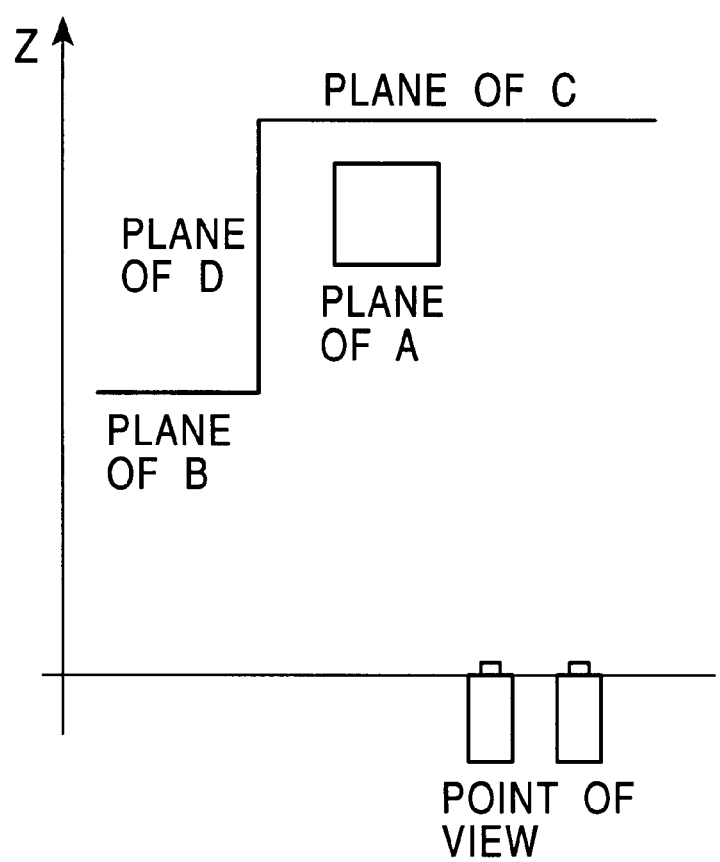
FIG. 3 is a diagram illustrating the relation between the objects to be imaged as parallax images in FIG. 2, and the point of view.

As shown in FIG. 3, in the event of showing an image containing objects and scenes with differing object distances from the point of view, conventional three-dimensional image showing apparatuses only show two images taking the parallax of the left and right eyes into consideration to the two eyes, wherein almost all objects and scenes in the image are in focus. Specifically, as shown in FIG. 2A, all objects and scenes shown in FIG. 3, i.e., the objects A through D which each have different distances from the point of view, are shown with a clear outline.

With the image processing apparatus and image processing method according to the present invention, the point of view position of the user on the image is obtained, and the focus is made on object images at the fixation point position so that these images a shown with a clear outline, while objects at distances differing from that of the fixation point position are shown to the user out of focus, to a degree according to the amount of shift from the standard distance which is the distance from the object at the fixation point, i.e., according to the difference in distance.

FIGS. 2B and 2C illustrate examples of the shown image with the image processing apparatus according to the present invention. FIG. 2B is an image shown to the user in the event that the view of the user is fixed on the object "A". In this case, the outline of "A" becomes clear, i.e., in focus, and the other B, C, and D are images with out-of-focus generated according to the amount of offset from the standard distance of the object at the fixation point, i.e., the point of view of the object "A". This amount of offset is obtained as the distance in the Z-axial direction in FIG. 3, for example.

FIG. 2C is an image shown to the user in the event that the view of the user is fixed on the object "C". In this case, the outline of "C" becomes clear, i.e., in focus, and the other A, B, and D are images with out-of-focus generated according to the amount of offset from the standard distance of the object at the fixation point, i.e., the point of view of the object "C". In the case of FIG. 2C, the amount of offset from the standard distance is greater for "B" than "A", and the amount of out-of-focus generated is also greater for "B" than "A".

With the image processing apparatus and image processing method according to the present invention, the point of fixation of the user, i.e., the potion which the user is actually observing is shown as an image in focus, and display components with distances that are different from the distance between the object or scene serving as the display components at the fixation point and the point of view, i.e., display components with offset distances, are subjected to image processing wherein out-of-focus is generated according to the amount of offset and applied thereto for showing to the user. According to the configuration of the present invention, the user is able to observe three-dimensional images of a sensation closer to reality. The following is a detailed description of the image processing apparatus and image processing method according to the present invention.

First Embodiment

Figure 4:
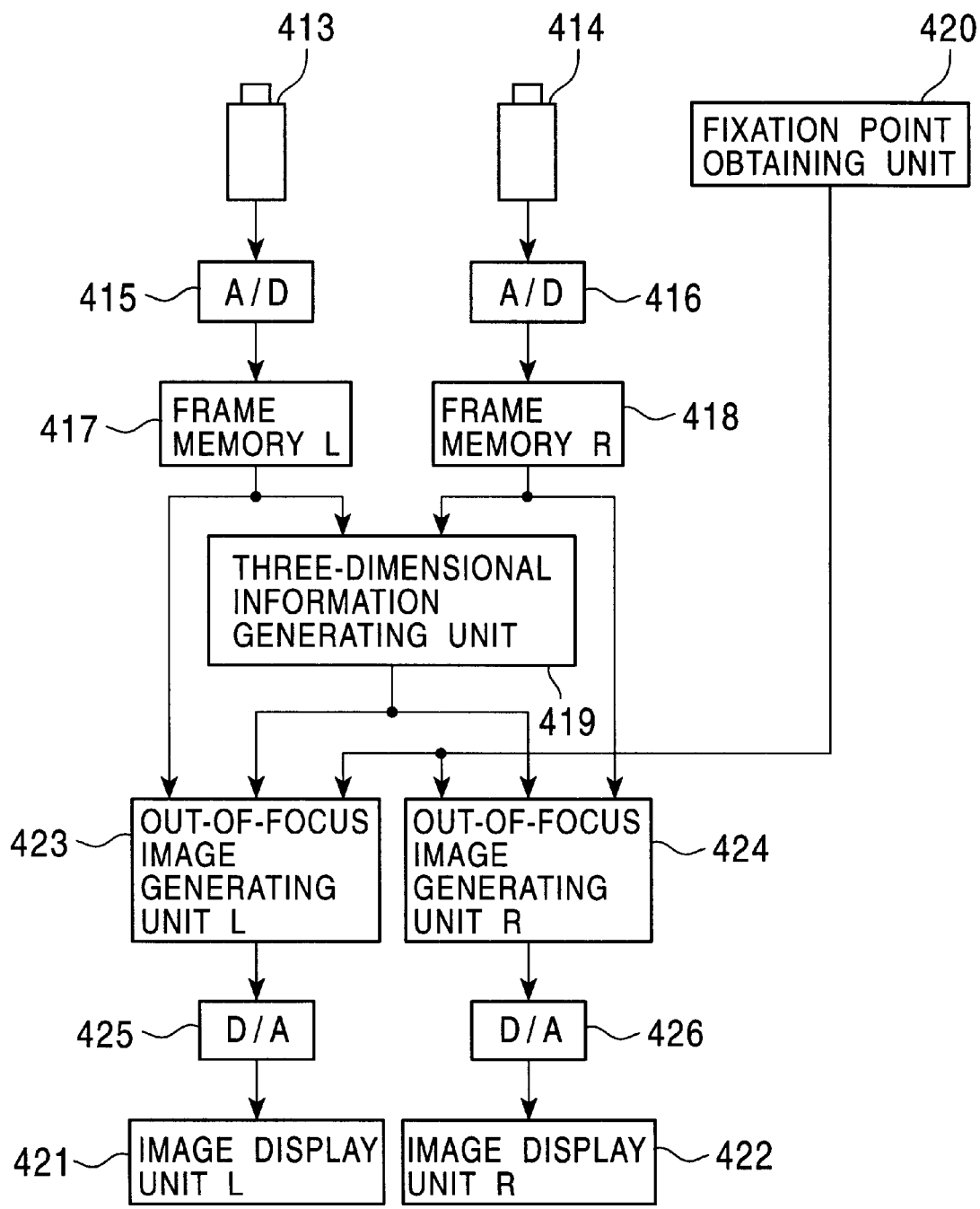
FIG. 4 is a block diagram illustrating primarily the functional configuration of a first embodiment of the image processing apparatus according to the present invention.

FIG. 4 is a function block diagram illustrating the first embodiment of the image processing apparatus according to the present invention. Images synchronously taken by the camera L 413 and the camera R 414 are subjected to analog/digital conversion processing at A/D converting units 415 and 416, and the digital data of each is stored in frame memory L 417 and frame memory R 418, respectively. The positional relation between the camera L 413 and the camera R 414 is fixed, and the same scene is observed with parallel optical axes for example having a spacing close to that of human eyes. Incidentally, with the image processing apparatus and method according to the present invention, processing for generating out-of-focus is performed based on the images taken by the camera L 413 and the camera R 414, so the field depth of the field being taken should be great, in order to allow focus to be made at all positions of the image taken by the camera L 413 and the camera R 414.

The three-dimensional information generating unit 419 obtains three-dimensional information regarding the objects or scenes within the image, such as distance information for example, based on the information stored in the frame memory L 417 and the frame memory R 418. Generating of the three-dimensional information will be described in detail later.

The fixation point obtaining unit 420 obtains information regarding at which point on the image display unit L 421 and image display unit R422 at the user is visually fixed on. The fixation point information obtaining mechanism of the fixation point obtaining unit 420 will also be described in detail later.

The out-of-focus image generating unit L 423 and the out-of-focus image generating unit R 424 each receive image data from the frame memory L 417 and the frame memory R 418 respectively, and also receive three-dimensional information from the three-dimensional information generating unit 419 and fixation point position information from the fixation point obtaining unit 420. The out-of-focus image generating unit L 423 and the out-of-focus image generating unit R 424 perform out-of-focus image generating processing to the image data obtained from the frame memory L 417 and the frame memory R 418, based on the three-dimensional information received from the three-dimensional information generating unit 419 and the fixation point position information received from the fixation point obtaining unit 420. The out-of-focus image generating processing by the out-of-focus image generating unit L 423 and the out-of-focus image generating unit R 424 will also be described in detail later.

The out-of-focus image data generated by the out-of-focus image generating unit L 423 and the out-of-focus image generating unit R 424 is subjected to digital/analog conversion at the D/A converting units 425 and 426 respectively, and then displayed to the user at the image display unit L 421 and image display unit R422.

As a result of such a configuration, the image data displayed to the user is such wherein out-of-focus image generating processing has been applied to object images having a distance which is different from the distance between the fixation point object and the point of view, in areas other than the fixation point of the user, as shown in FIGS. 2B and 2c, so that an image closer to actual observation in three-dimensional space can be shown to the user.

Next, the three-dimensional information generating unit 419, fixation point obtaining unit 420, out-of-focus image generating unit L 423, and out-of-focus image generating unit R 424 will be described in detail.

(1) Three-dimensional Information Generating Unit

First, the three-dimensional information generating unit 419 will be described. The three-dimensional information generating unit 419 generates three-dimensional information, i.e., distance information, for objects and scenes contained within the image, based on information taken by the camera L 413 and the camera R 414 and stored in the frame memory L 417 and frame memory R 418. The three-dimensional information of the objects and scenes contained within the image can be obtained by the principle of the stereo method, for example.

The following is a description of the stereo method.

With the stereo method, multiple cameras are used to take a single object from two or more directions (differing visual line directions) to obtain multiple images, which are correlated on a pixel basis, thereby obtaining the position of an object to be measured within the three-dimensional space. For example, the same object is taken from different directions by a standard camera and a reference camera, and the distance of the object to be measured within each image is measured according to the principle of triangulation.

Figure 5:
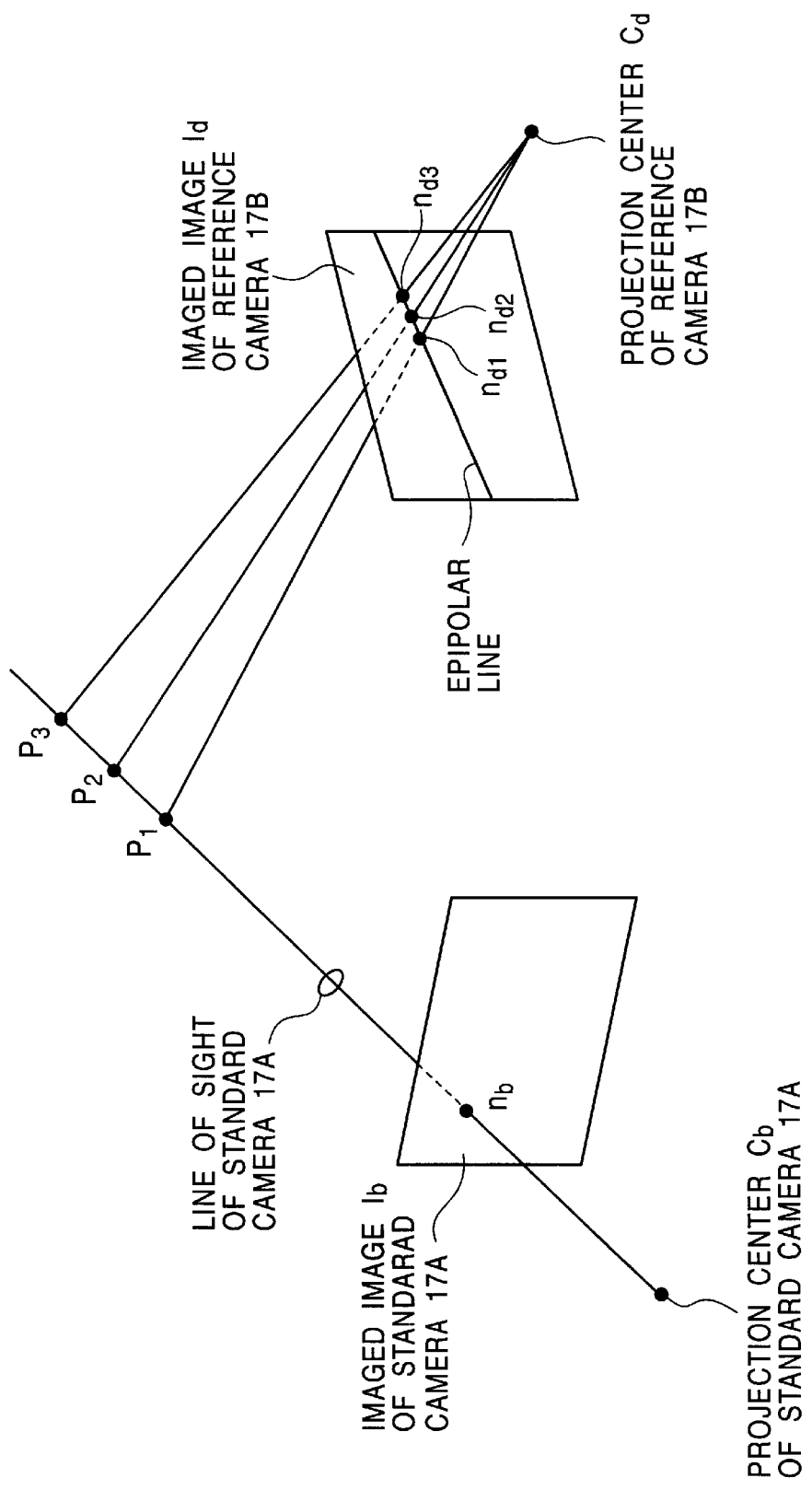
FIG. 5 is a diagram describing a stereo method applicable to the three-dimensional information obtaining configuration of the image processing apparatus according to the present invention.

FIG. 5 is a diagram describing the principle of the stereo method. The standard camera and reference camera take the same object from different directions. Let us consider a case of obtaining the depth of a point "mb" within the image taken by the standard camera.

The object which appears at the point "mb" in the image taken by the standard camera is rendered along a straight line in the image taken by the reference camera which is taking the same object from a different direction, in the manner of "m1", "m2", and "m3". This straight line is called an "epipolar line".

The position of the point "mb" in the image taken by the standard camera appears on the straight line called the "epipolar line" in the image taken by the reference camera. Points P (i.e., points existing on a straight line, including P1, P2, P3) which are the object of imaging appear at the same observation point "mb" on the standard image, regardless of the depth, i.e., the distance form the standard camera, so long as they exist on the visual line of the standard camera. Conversely, the points P in the image taken by the reference camera appear at positions according to greatness of distance between the standard camera and the observation point P on the epipolar line.

FIG. 5 shows the correlation between the epipolar line and the observation point "mb" in the reference image. As shown in the Figure, changing of the position of the observation point P from P1 to P2 to P3 shifts the observation point on the reference image from "m1" to "m2" to "m3".

The distance of the point P can be identified, by searching the observation point "mb" on the epipolar line, using the above geometric optical characteristics. This is the basic principle of the "stereo method".

Regarding the method for judging with which of "m1", "m2", and "m3" on the epipolar line in the image taken by the reference camera that the standard camera point "mb" is correlated, there is the following method. For example, in the event of contrasting "mb" and "m1", a window 5 pixels by 5 pixels centered at "mb", "m1" is prepared and the absolute value of the difference in luminance value at the pixels whose position correspond with the inside of the window. The absolute values are obtained for all within the 5 pixels by 5 pixels window, and then the sum thereof is obtained. This sum is taken as an evaluation function value (SAD), and that with the smallest (SAD) value is judged to have a high degree of similarity. This (SAD) is obtained for each point on the epipolar line, and the point "mb" with the smallest (SAD) value is taken as the corresponding point.

The (SAD) corresponding to a window M by N is represented by the following expression.

Expression 13

$$(SAD) = \sum_{i=0}^{M-1} \sum_{j=0}^{N-1} |I(i,j) - I'(i,j)|$$

In the above Expression, I (i, j) is the luminance value at each pixel in the image of the standard camera, and I' (i, j) is the luminance value at each pixel in the image of the reference camera.

The three-dimensional information generating unit 419 obtains the three-dimensional information for all pixels on the screen by this method, and the obtained three-dimensional information can be used as pixel attributes data corresponding with each pixel.

However, it should be noted that the above-described stereo method is one technique for obtaining three-dimensional information, the three-dimensional information generating method applied to the three-dimensional information generating unit 419 of the image processing apparatus according to the present invention is not restricted to the stereo method, and rather a light-section method with slit light, a method using moire, a distance measuring method according to pattern light irradiation, etc., can be used, for example.

Also, the above-described stereo method is a configuration using one standard camera and one reference camera, but a configuration may be used wherein evaluation values are obtained by the multi-baseline stereo method wherein multiple reference cameras are used, and three-dimensional information is obtained for each pixel based on the evaluation values. The multi-baseline stereo method involves using images taken by one standard camera and multiple reference cameras, obtaining evaluation values representing the correlation with the standard camera image for each of the multiple reference camera images, and taking the added evaluation values thereof as a final evaluation value. Details of this multi-baseline stereo method are described in, e.g., "Stereo Matching Using Multiple Baselines", Institute of Electronics, Information and Communication Engineers Journal D-11 Vol. J75-D-II No. 8, pp. 1317–1327, August 1992.

(2) Fixation Point Obtaining Unit

Next, the fixation point obtaining unit 420 will be described in detail. The fixation point obtaining unit 420 obtains information regarding at which point on the image display unit L 421 and image display unit R422 that the user is visually fixed on. The fixation point obtaining unit 420 uses sensors positioned at the image display unit L 421 and image display unit R422 that the user is viewing to obtain or output for calculating the visual line direction of the user or the three-dimensional space position, and detects the fixation point position of the user at the image display unit, based on this sensor output.

Though there are various methods for detecting user point of view, for example, CCD video cameras can be positioned at the image display unit L 421 and image display unit R422, and calculation can be made by recognizing the images output from the CCD video cameras. Specifically, as described in "Yagi et al., Configuring Common Platforms for Image Information Processing, Information Processing Research Journal Vol. 98, No. 26ISSN0919-6072 98-CVM-110-9, 1998. 3. 19" for example, the face area of the user can be clipped out from an images taken by cameras for example, and the position of the eyes can be obtained by applying the above-described stereo method so as to calculate the point of view. Or, the point of view can be calculated by obtaining the position of markers attached to the face of the user by image processing. Then, the visual line direction is obtained, and the fixation point position is detected.

Incidentally, in the event that the image display unit L 421 and image display unit R 422 are of a configuration wherein the distance between the eyeball and the display is fixed, such as with an HMD (head mounted display), obtaining the three-dimensional position of the fixation point position using multiple cameras with the above stereo method is not a prerequisite, and an configuration may be used wherein the visual line direction alone is obtained from an image taken by a single camera, thereby obtaining the fixation point position on the image display unit based on the predetermined distance between the eyes of the user and the image display unit provided to the head mounted display.

Further, regarding other configurations for obtaining the fixation point, there is the configuration disclosed in Japanese Unexamined Patent Application Publication No. 5-199995, for example, besides the stereo method. This is a configuration wherein near infra-red light from a light source is irradiated into the eyeballs, and the light reflected therefrom is imaged on an imaging device within a camera, and also wherein focal adjustment and zoom-in/out driving of the lens system is performed based on the image reflected at a half-mirror and imaged onto a CCD line sensor, thereby calculating the rotation angle of the eyeball based on the amount of movement of the lens and on the image at the imaging device, so as to perform visual line detection.

Regarding specific configurations of the fixation point obtaining unit 420, fixation point recording devices manufactured by Nac Co., Ltd. or Canadian company H. K. EyeCan Limited for example, can be used.

(3) Out-of-focus Image Generating Units

Next, the out-of-focus image generating unit L 423 and out-of-focus image generating unit R 424 will be described in detail.

The out-of-focus image generating unit L 423 and the out-of-focus image generating unit R 424 perform out-of-focus image generating processing to the image data obtained from the frame memory L 417 and the frame memory R 418, based on the three-dimensional information received from the three-dimensional information generating unit 419 and the fixation point information received from the fixation point obtaining unit 420.

Figure 6:
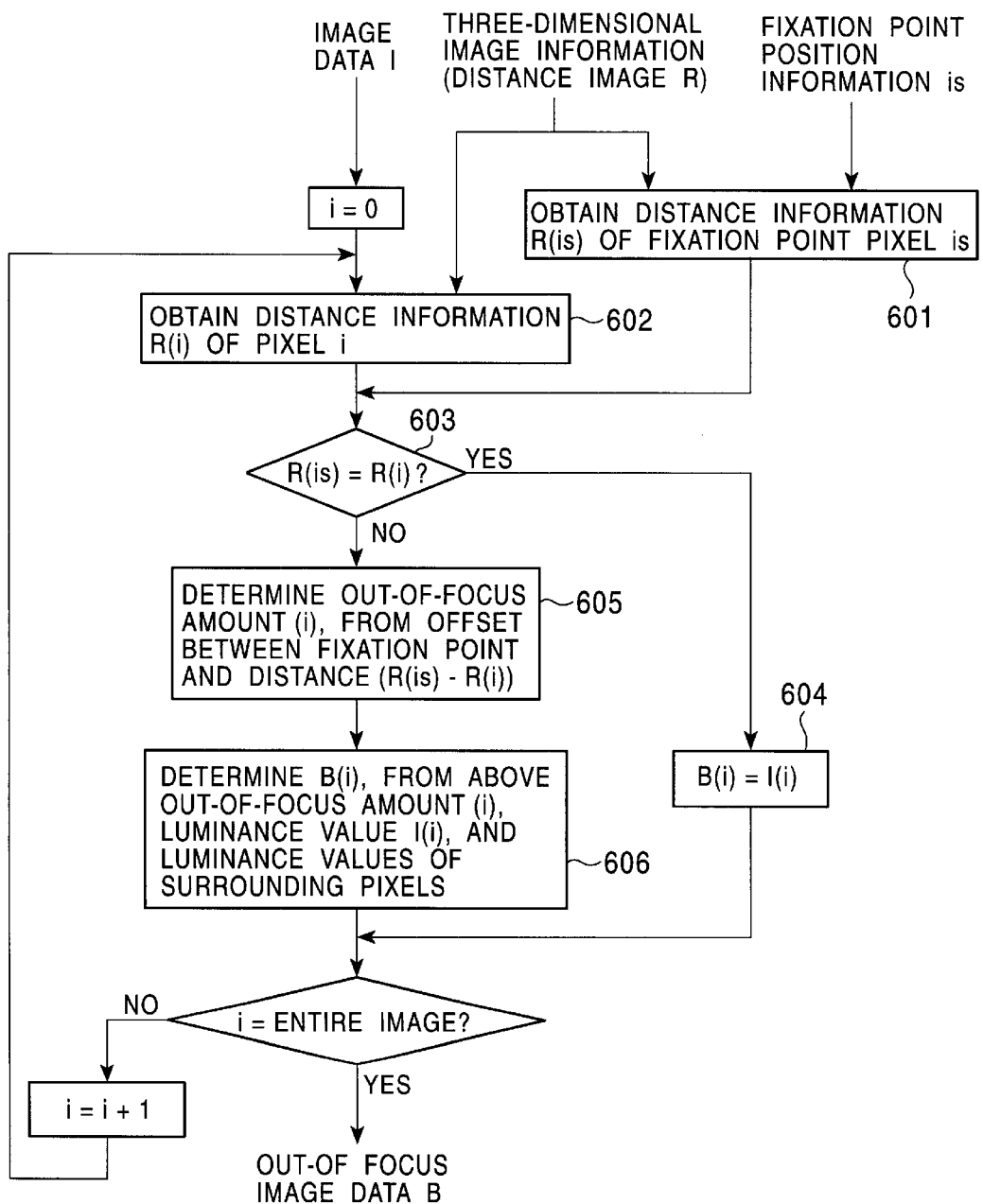
FIG. 6 is a diagram illustrating the processing flow for generating out-of-focus images with the image processing apparatus according to the present invention.

FIG. 6 is a flowchart for describing the flow of processing at the out-of-focus image generating units. In FIG. 6, the image data I represents image data stored in the frame memory L 417 and the frame memory R 418 shown in FIG. 4, and the three-dimensional information is three-dimensional information obtained by the three-dimensional information generating unit 419, and specifically is transferred to the out-of-focus image generating unit as distance image R. The fixation point position information "is" is position information representing the fixation point position pixel obtained from the fixation point obtaining unit 420. Also, "i" represents an arbitrary pixel, I(i) represents the luminance value of the pixel "i" of the image data I obtained from the frame memory L 417 and frame memory R 418, R(i) represents the distance data of the pixel "i", and R(is) is the distance data of the pixel "is". These are obtained by the three-dimensional information generating unit 419. B(i) represents the luminance value of the pixel "i" of the out-of-focus image data, i.e., the luminance value of the pixel "i" following out-of-focus image processing.

First, the distance data R(is) of the fixation point pixel "is" is obtained from the fixation point pixel "is" which is the fixation point position information obtained from the fixation point obtaining unit 420 obtained in Step 601, and the distance image R obtained from the three-dimensional information generating unit 419.

In Step 602, the distance data R(i) indicated by the pixel "i" is obtained from the distance image R regarding the pixel "i" of the image data I.

Next, in Step 603, comparison is made between the distance data R(i); regarding the pixel "i" of the image data I and the distance data R(is) of the fixation point pixel "is", and in the event that these are equal, the flow proceeds to Step 604 and sets B(i)=I(i) and proceeds to the processing of the next pixel. The processing of B(i)=I(i) in Step 604 means that no out-of-focus processing is applied. That is to say, in the event that the distance data R(i) regarding the pixel "i" and the distance data R(is) of the fixation point pixel "is" are the same, this means that the image data R(i) remains in focus. Incidentally, in the comparison processing between the distance data regarding the pixel "i" of the image data I and the distance data R(is) of the fixation point pixel "is" in Step 603, judgement processing of R(is)=R(i) is made in the flowchart shown here, but a configuration may be made wherein in the event that R(is) and R(i) are at a certain threshold value or lower, the out-of-focus processing in step S605 is not executed and the flow proceeds to step 604.

Next, in Step 605, the out-of-focus amount z(i) to be provided to the pixel "i", based on the offset (R(is)−R(i)) between the distance data R(is) of the fixation point (is) and the distance data R(i) regarding the pixel "i", is determined. The out-of-focus amount z(i) is obtained by the following Expression, for example.

Expression 14

$$\zeta(i) = \frac{R(is) - R(i)}{R(is)}$$

In Step 606, the luminance value B(i) of the out-of-focus image data pixel (i) from the luminance value as to the pixel (i) is determined based on the out-of-focus amount z(i) for the pixel (i) determined in Step 605 and the luminance value I(i), and the luminance values of the surrounding pixels, from the following Expression.

Expression 15

$$r(i) = a\zeta(i)$$

$$B(i) = \frac{\sum_{j \in w} I(j)}{N}$$

Now, the radius r(i) represents the area W defined as the surrounding area of the pixel "i", and "a" is a coefficient determined according to the out-of-focus to be represented, and can be set as a variable parameter which can be set by the user, for example. The letter "j" represents the pixels contained in the area W centered around the pixel "i", and N represents the number of pixels in the area W.

Executing the processing shown in FIG. 6 for all of the pixels generates an out-of-focus image for a left eye image to be displayed on the image display unit L 421 and an out-of-focus image for a right eye image to be displayed on the image display unit R 422, at the out-of-focus image generating unit L 423 and the out-of-focus image generating unit R 424.

The out-of-focus image data generated at the out-of-focus image generating unit L 423 and the out-of-focus image generating unit R 424 is subjected to digital/analog conversion at the respective D/A conversion units 425 and 426 shown in FIG. 4, and displayed to the user at the image display unit L 421 and the image display unit R 422.

Due to such a configuration, the image data displayed to the user is subjected to out-of-focus image generating processing at object images having a distance which is different to the distance between the fixation point object and the point of view, at areas other than the fixation point of the user, as shown in FIGS. 2B or 2C, thereby yielding an image which is closer to actual three-dimensional space observation.

Figure 7:
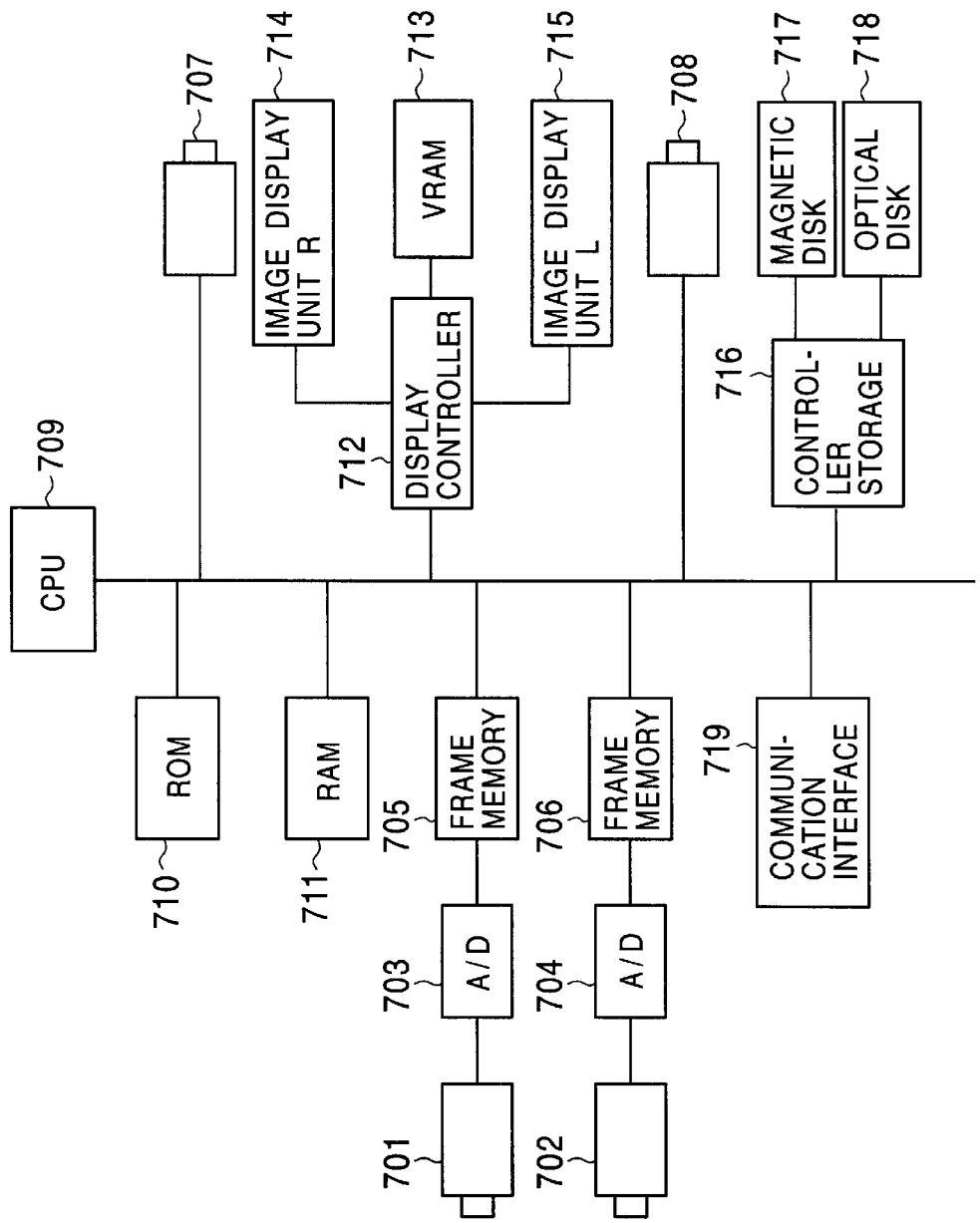
FIG. 7 is a block diagram illustrating a hardware configuration example of the first embodiment of the image processing apparatus according to the present invention.

A hardware configuration example for realizing the function block diagram relating to the first embodiment of the image processing apparatus according to the present invention shown in FIG. 4, is shown in FIG. 7.

Images synchronously taken by the camera R 701 and the camera L 702 are subjected to analog/digital conversion processing at A/D converting units 703 and 704, and the digital data of each is stored in frame memory R 705 and frame memory L 706, respectively. The camera R 701 and the camera L 702 are configured with parallel optical axes for example, having a spacing close to that of human eyes, such that the same scene is observed.

The CPU 709 performs generating of various types of information and control processing at the components shown in FIG. 4. For example, the CPU 709 performs the generating processing of the three-dimensional information at the three-dimensional information generating unit 419 shown in FIG. 4. This is performed by obtaining the three-dimensional information as distance information, applying the above-described stereo method for example based on the information of the frame memory 705 and 706 shown in FIG. 7. Also, the CPU 709 performs the obtaining processing for the fixation point information at the fixation point obtaining unit 420 shown in FIG. 4. This is performed by obtaining the right eye fixation point "is" (R) for the image display unit R based on the point of view information of the right eye of the user obtained by the sensor R 707 shown in FIG. 7, and by obtaining the left eye fixation point "is" (L) for the image display unit L based on the point of view information of the left eye of the user obtained by the sensor L 708. These are calculated respectively as the pixel position information "is" (R) and pixel position information "is" (L) of the image display unit R 714 and the image display unit L 716. Further, the CPU 709 performs generating processing of the out-of-focus images at the out-of-focus image generating unit L 423 and the out-of-focus image generating unit R 424 in FIG. 4. This is performed by following the processing flow shown in FIG. 6, described above.

The ROM 710 stores permanent program data, for example IPL, self-diagnostic programs (POST), code groups for executing hardware input/output operation (BIOS), and so forth.

The RAM 711 is writable memory used for the CPU 709 to load executing program code or for temporarily storing workdata. The RAM 711 is used for storing necessary data and programs in the three-dimensional information generating processes, fixation point information obtaining processes, and out-of-focus image generating process.

The display controller 712 performs display control of the image display unit R 714 and image display unit L 715. The VRAM 713 is memory for temporarily storing the display data of the image display unit R 714 and image display unit L 715. The image data taken by the camera R 701 and camera L 702 and written to the respective frame memory is subjected to out-of-focus image generation by the CPU 709 based on the three-dimensional information and fixation point information, which is temporarily stored in the VRAM 713 via the display controller 712, and supplied to the image display unit R 714 and image display unit L 715. The image display unit R 714 and image display unit L 715 are subjected to out-of-focus image generation processing according to the fixation point of the user, and thus the image becomes an image closer to actual three-dimensional space observation, as shown in FIGS. 2B or 2C.

The image display unit R 714 and image display unit L 715 are specifically configured of display means such as CRTs or LCDS. The image processing apparatus according to the present invention necessitates that the image display units be of a configuration capable of displaying images generated by out-of-focus image generation processing in increments of pixels, and thus must be display means such as CRTS or LCDs capable of supporting bitmap display formats.

The storage controller 716 is for executing access control to a magnetic disk 717 and optical disk 718 for example, and is configured so as to access various types of processing programs, virtual image data, or actual image data, etc., recorded in the magnetic disk 717 and optical disk 718, and performing image processing based on the accessed data. Incidentally, the image processing based on the image data stored in these storage mediums will be described in the second embodiment on.

The communication interface 719 is a device for connecting to a network by a predetermined communication protocol, TCP/IP for example. Multiple computer systems (hereafter also referred to as "remote systems"; not shown in the drawings) exist on the network. The image processing apparatus according to the present invention is capable of transferring an image which has been processed by itself to a remote system via network. Or, supply of image data files or program files can be received from remote systems via network.

Incidentally, in order to actually configure the image processing apparatus according to the present invention, many other hardware components other than those shown in FIG. 7 are necessary. However, these are known to those in the trade, and do not configure the essentials of the present invention, and thus are omitted from description in the present description. Also, note that the connections between the hardware blocks in the drawings have been represented in abstract manner, in order to avoid the drawings from becoming complicated.

Second Embodiment

Figure 8:
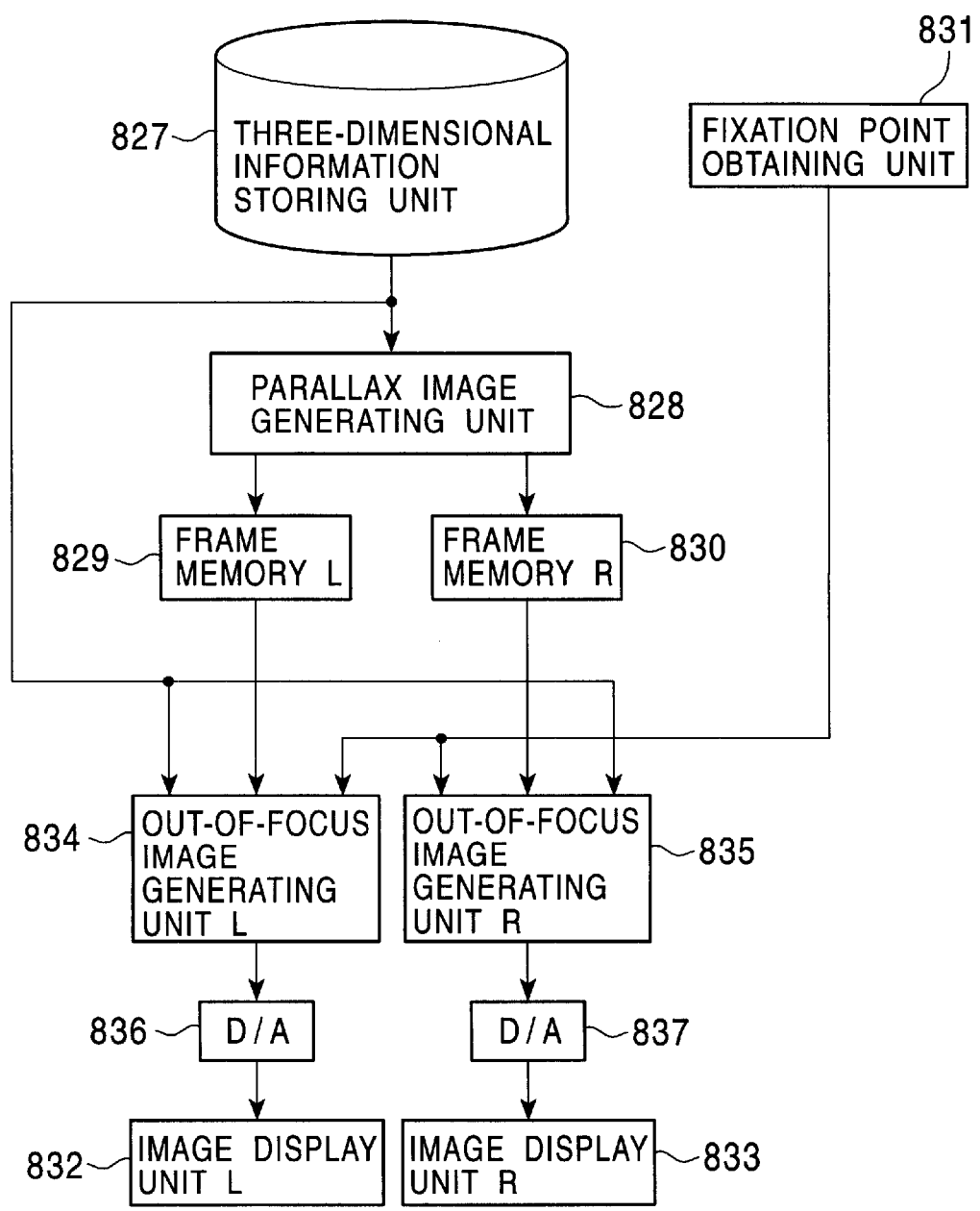
FIG. 8 is a block diagram illustrating the configuration of a second embodiment of the image processing apparatus according to the present invention.

FIG. 8 illustrates the configuration of the second embodiment of the image processing apparatus according to the present invention. An image is generated from the point of view position, i.e., the point of view positions of left and right, at the parallax image generating unit 828, based on the three-dimensional information stored in the three-dimensional information storing unit 827. The image generated at the at the parallax image generating unit 828 is stored in the frame memory L 829 and the frame memory R 830.

The fixation point obtaining unit 831 obtains information regarding at which point on the image display unit L 832 and image display unit R 833 that the user is visually fixed on.

The out-of-focus image generating unit L 834 and the out-of-focus image generating unit R835 receive image data from the respective frame memory L 829 and the frame memory R 830, and also receive three-dimensional information from the three-dimensional information storing unit 827 and fixation point position information from the fixation point obtaining unit 831. The out-of-focus image generating unit L 834 and the out-of-focus image generating unit R835 subject the image data from the frame memory L 829 and the frame memory R 830 to out-of-focus image generating processing, based on the three-dimensional information from the three-dimensional information storing unit 827 and the fixation point position information from the fixation point obtaining unit 831.

The fixation point obtaining processing of the fixation point obtaining unit 831, and the out-of-focus image generating processing of the out-of-focus image generating unit L 834 and the out-of-focus image generating unit R 835, are the same as that of the first embodiment.

Stored in the three-dimensional information storing unit 827 is three-dimensional information prepared beforehand, i.e., the distance information obtained at the three-dimensional information generating unit shown in FIG. 4 with the first embodiment, in a manner corresponding to the image data. The distance information stored in the three-dimensional information storing unit 827 may be stored distance information generated by the stereo method using the above-described standard camera and reference camera. Also, three-dimensional information obtained for each pixel based on evaluation values obtained by the multi-baseline stereo method wherein multiple reference cameras are used may be used as the distance information, or further, distance information generating using methods other than the stereo method may be used, such as a light-section method with slit light, a method using moire, a distance measuring method according to pattern light irradiation, etc.

The out-of-focus image generating unit L 834 and the out-of-focus image generating unit R 835 execute processing according to the processing flow shown in FIG. 6 and generate out-of-focus images, based on the stored data and the fixation point information received from the fixation point obtaining unit, as with the first embodiment.

The parallax image generating unit 828 generates an image from the point of view position, i.e., the point of view positions of left and right, based on the data stored in the three-dimensional information storing unit 827. The three-dimensional information storing unit 827 stores data capable of generating images from the point of view positions of left and right generated in the parallax image generating unit 828. For example, this may be multiple sets of image data of actual images taken from multiple point of view positions, combinations of distance data calculated from the multiple sets of image data, virtual three-dimensional computer graphics data generated based on computer graphics technology, and so forth.

The parallax image generating unit 828 generates images from point of view positions of left and right based on the real image data, distance data, computer graphics data, combination of real image data and computer graphics data, etc., stored in the three-dimensional information storing unit 827, and stores this in the frame memory L 829 and the frame memory R 830.

The out-of-focus image generating unit L 834 and the out-of-focus image generating unit R 835 execute out-of-focus image generating processing, and display the left eye out-of-focus image and the right eye out-of-focus image on the image display unit L 832 and the image display unit R 833, via the respective D/A converting units 836 and 837.

As with the first embodiment, the image data displayed to the user according to the second embodiment is also subjected to out-of-focus image generating processing at object images having a distance which is different to the distance between the fixation point object and the point of view, at areas other than the fixation point of the user, as shown in FIGS. 2B or 2C, thereby yielding an image which is closer to actual three-dimensional space observation. The configuration of the second embodiment is capable of showing virtual computer graphics data generated based on computer graphics technology, not only images taken by cameras, and can also. show images formed by combining the two.

Incidentally, the hardware configuration of the image processing apparatus according to the second embodiment is realized in the configuration shown in FIG. 7 described with the first embodiment. In the configuration shown in FIG. 7, the magnetic disk 717 and optical disk 718 are equivalent to the three-dimensional information storing unit 827 in FIG. 8. Incidentally, the three-dimensional information storing unit 827 is not restricted to the magnetic disk 717 and optical disk 718 shown in FIG. 7, and rather may be a magneto-optical disk, or other solid memory, or may be a format wherein data transferred externally via a communication interface is used successively.

Third Embodiment

Figure 9:
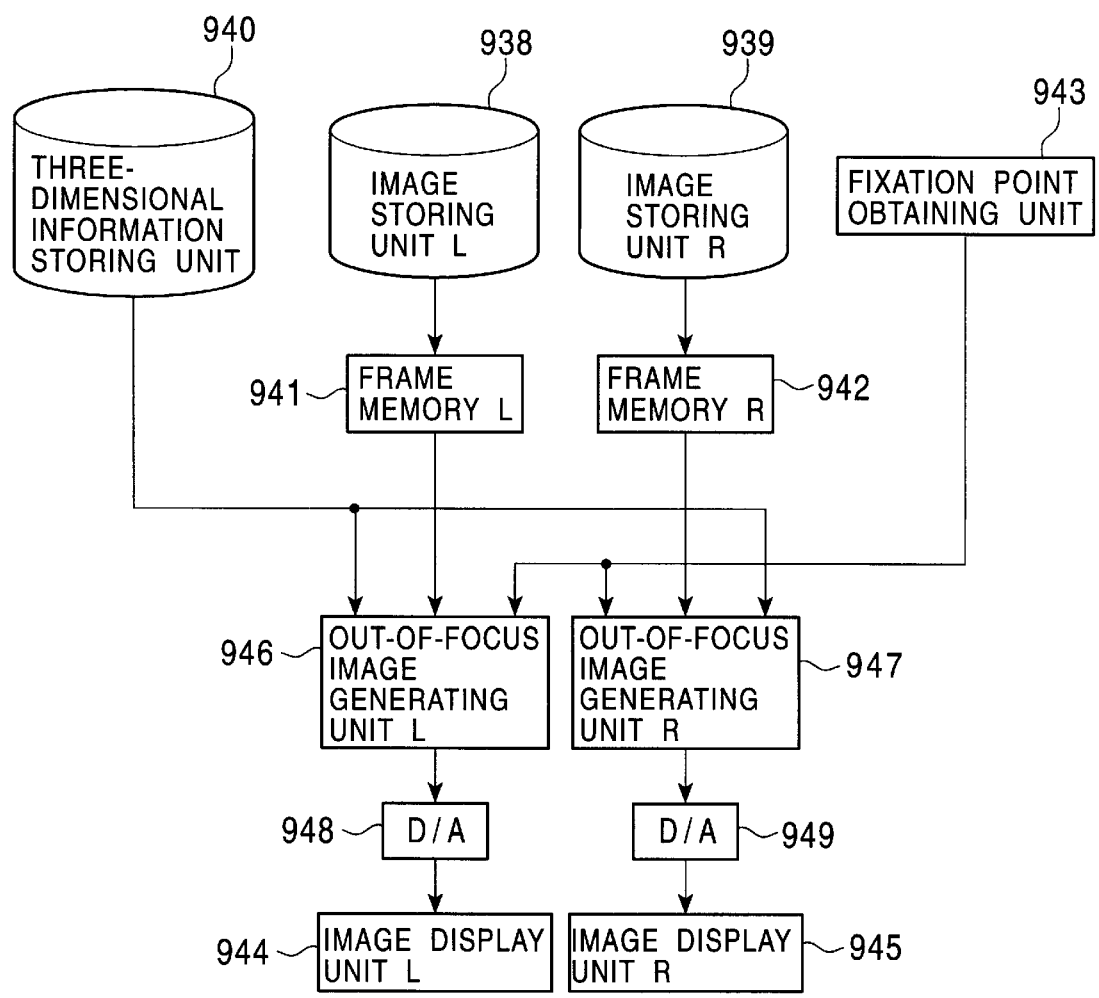
FIG. 9 is a block diagram illustrating the configuration of a third embodiment of the image processing apparatus according to the present invention.

FIG. 9 illustrates the configuration of the third embodiment of the image processing apparatus according to the present invention. Images to be provided to the left and right eyes, i.e., source images are configured as stored information prepared beforehand in the respective image storing unit L 938 and image storing unit R 939. Further, the three-dimensional information storing unit 940 stores three-dimensional information relating to the image information stored in the image storing unit L 938 and image storing unit R 939. This corresponds to the distance information described in the first embodiment. This is distance information obtained by the above stereo method for example, and is distance information obtainable by the stereo method wherein the standard camera and the reference camera are combined.

The image stored in the image storing unit L 938 and image storing unit R 939 may be image data of an actual image taken from the left and right point of view positions, or image data from the left and right point of view positions for virtual three-dimensional computer graphics image data generated by computer graphics technology, or combinations thereof.

The three-dimensional information storing unit 940 stores distance information relating to the information stored in the image storing unit L 938 and image storing unit R 939, and in the event that actual image data is stored in the image storing unit L 938 and image storing unit R 939, three-dimensional information corresponding to the real image data is stored, and in the event that computer graphics data is stored therein, three-dimensional information corresponding to the stored computer graphics data is stored.

The distance information stored in the three-dimensional information storing unit 940 may be obtained by the stereo method based on the information stored in the image storing unit L 938 and image storing unit R 939, or distance information generated on its own using its own standard camera and reference camera may be stored. Also, three-dimensional information obtained for each pixel based on evaluation values obtained by the multi-baseline stereo method wherein multiple reference cameras are used may be stored. Further, distance information may be stored using methods other than the stereo method, such as a light-section method with slit light, a method using moire, a distance measuring method according to pattern light irradiation, etc.

Image data stored beforehand in the image storing unit L 938 and image storing unit R 939 is transferred to the frame memory L 941 and the frame memory R 942.

The fixation point obtaining unit 943 obtains information regarding at which point on the image display unit L 944 and image display unit R 945 that the user is visually fixed on.

The out-of-focus image generating unit L 946 and the out-of-focus image generating unit R 947 receive image data from the respective frame memory L 941 and the frame memory R 942, and also receive three-dimensional information from the three-dimensional information storing unit 940 and fixation point position information from the fixation point obtaining unit 943. The out-of-focus image generating unit L 946 and the out-of-focus image generating unit R 947 subject the image data from the frame memory L 941 and the frame memory R 942 to out-of-focus image generating processing, based on the three-dimensional information from the three-dimensional information storing unit 940 and the fixation point position information from the fixation point position obtaining unit 943.

The fixation point obtaining processing of the fixation point obtaining unit 943, and the out-of-focus image generating processing of the out-of-focus image generating unit L 946 and the out-of-focus image generating unit R 947, are the same as that of the first embodiment, and generate out-of-focus images according to the processing flow shown in FIG. 6.

According to this processing, out-of-focus image generating processing is performed on object images having a distance which is different to the distance between the fixation point object and the point of view, at areas other than the fixation point of the user, as shown in FIGS. 2B or 2C, thereby yielding an image which is closer to actual three-dimensional space observation.

Incidentally, the hardware configuration of the image processing apparatus according to the third embodiment is realized in the configuration shown in FIG. 7 described with the first embodiment. In the configuration shown in FIG. 7, the magnetic disk 717 and optical disk 718 configure the three-dimensional information storing unit 940, image storing unit L 938 and image storing unit R 939 shown in FIG. 9. Incidentally, the information storing units are not restricted to the magnetic disk 717 and optical disk 718 shown in FIG. 7, and rather may be a magneto-optical disk, or other solid memory, or may be a format wherein data transferred externally via a communication interface is used successively.

Fourth Embodiment

In the above first through third embodiments, a configuration for showing images corresponding to the left and right eyes of a user wearing a head mounted display for example so as to allow objects and scenes in the images to be viewed in a three-dimensional manner, i.e., a configuration which generates different images for the left and right and displays these to the user, has been described, but in the following fourth through sixth embodiments, a configuration wherein a single image, i.e., an image not having parallax, is shown to the user, and gives a three-dimensional sensation closer to the real world.

Figure 10:
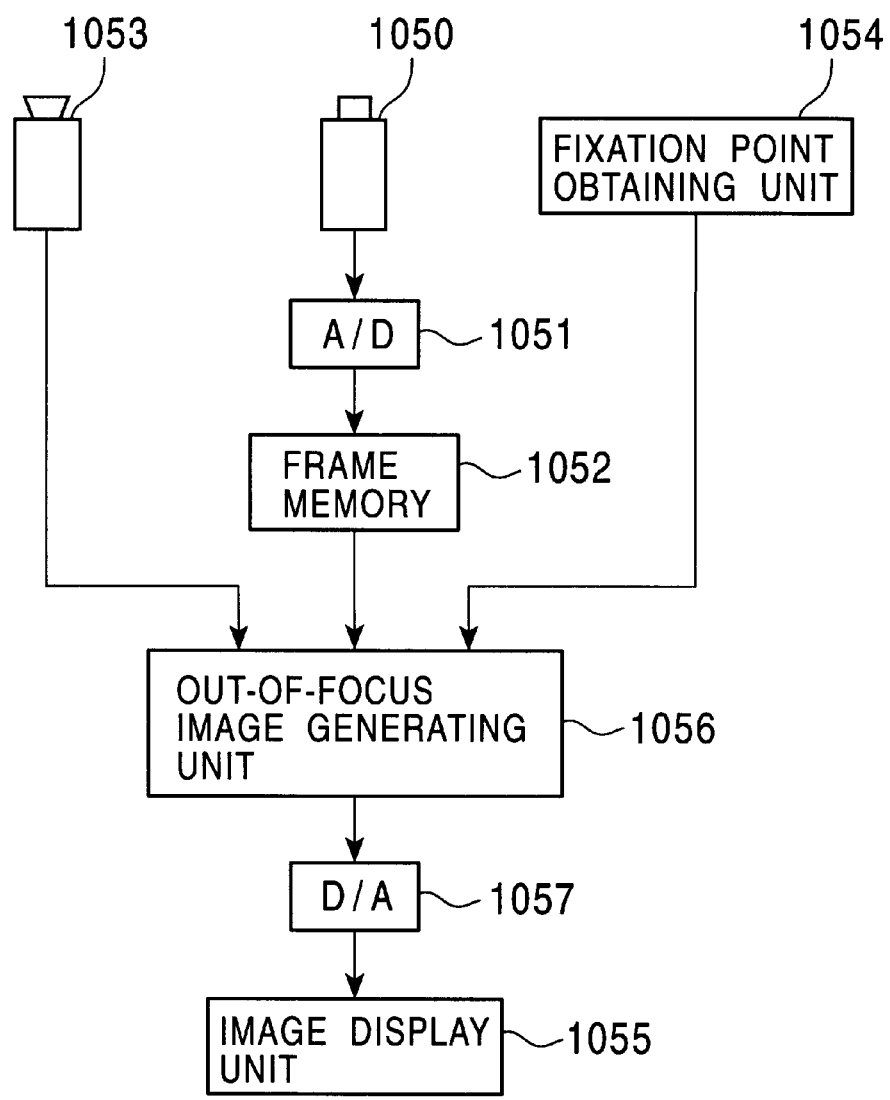
FIG. 10 is a block diagram illustrating the configuration of a fourth embodiment of the image processing apparatus according to the present invention.

FIG. 10 is a block diagram of the fourth embodiment of the image processing apparatus according to the present invention. Images taken from the camera 1050 are subjected to analog/digital conversion processing at A/D converting unit 1051, and the digital data is stored in the frame memory 1052. Incidentally, processing for generating out-of-focus is performed based on the images taken by the camera 1050, so the field depth of the field being taken should be great, in order to allow focus to be made at all positions of the image taken by the camera 1050.

The three-dimensional information obtaining device 1053 is a device for obtaining three-dimensional information as described in the above embodiment, and obtains three-dimensional information by the stereo method wherein an object is taken using a standard camera and reference camera with different visual line directions. Also, three-dimensional information may be obtained for each pixel based on evaluation values obtained by the multi-baseline stereo method wherein multiple reference cameras are used. Further, generated distance information may be obtained using methods other than the stereo method, such as a light-section method with slit light, a method using moire, a distance measuring method according to pattern light irradiation, etc.

The fixation point obtaining unit 1054 obtains information regarding at which point on the image display unit 1055 being observed by the user that the user is visually fixed on. Incidentally, the fixation point obtaining configuration in the above first through third embodiments involved detecting the fixation point of one eye, .i.e., the fixation point of the left eye for processing for the left eye, but with the fixation point obtaining unit 1054 in the present embodiment, the fixation points for both left and right eyes are obtained, averaged, and the average value thereof is taken as the fixation point. Or, since a state wherein the left and right eyes are observing different points does not occur readily, an arrangement may be used wherein the fixation point is measured for one eye only, and this is used as the fixation point information.

The out-of-focus image generating unit 1056 receives image data from the frame memory 1052, and also receives three-dimensional information from the three-dimensional information obtaining device 1053 and fixation point position information from the fixation point obtaining unit 1054. The out-of-focus image generating unit 1056 subject the image data from the frame memory 1052 to out-of-focus image generating processing, based on the three-dimensional information from the three-dimensional information generating unit 1053 and the fixation point position information from the fixation point obtaining unit 1054.

The fixation point obtaining processing of the fixation point obtaining unit 1054, and the out-of-focus image generating processing of the out-of-focus image generating unit 1056, are the same as that of the first embodiment, and perform processing for generating out-of-focus images according to the processing flow shown in FIG. 6.

The out-of-focus image data generated at the out-of-focus image generating unit 1056 is subjected to digital/analog conversion at the D/A conversion unit 1057, and displayed to the user at the image display unit 1005.

The configuration of the fourth embodiment uses a single image display apparatus, and the image displayed on the image display unit 1055 is dynamically subjected to out-of-focus image generating processing wherein the focus is matched for objects and scenes which are user fixation point object components, and for display components having the same distance as fixation point object components, and components having a distance which is different to this are subjected to out-of-focus image generating processing according to the distance difference thereof. Accordingly, the user can observe the image display unit 1055 with a sensation closer to the real world.

Figure 11:
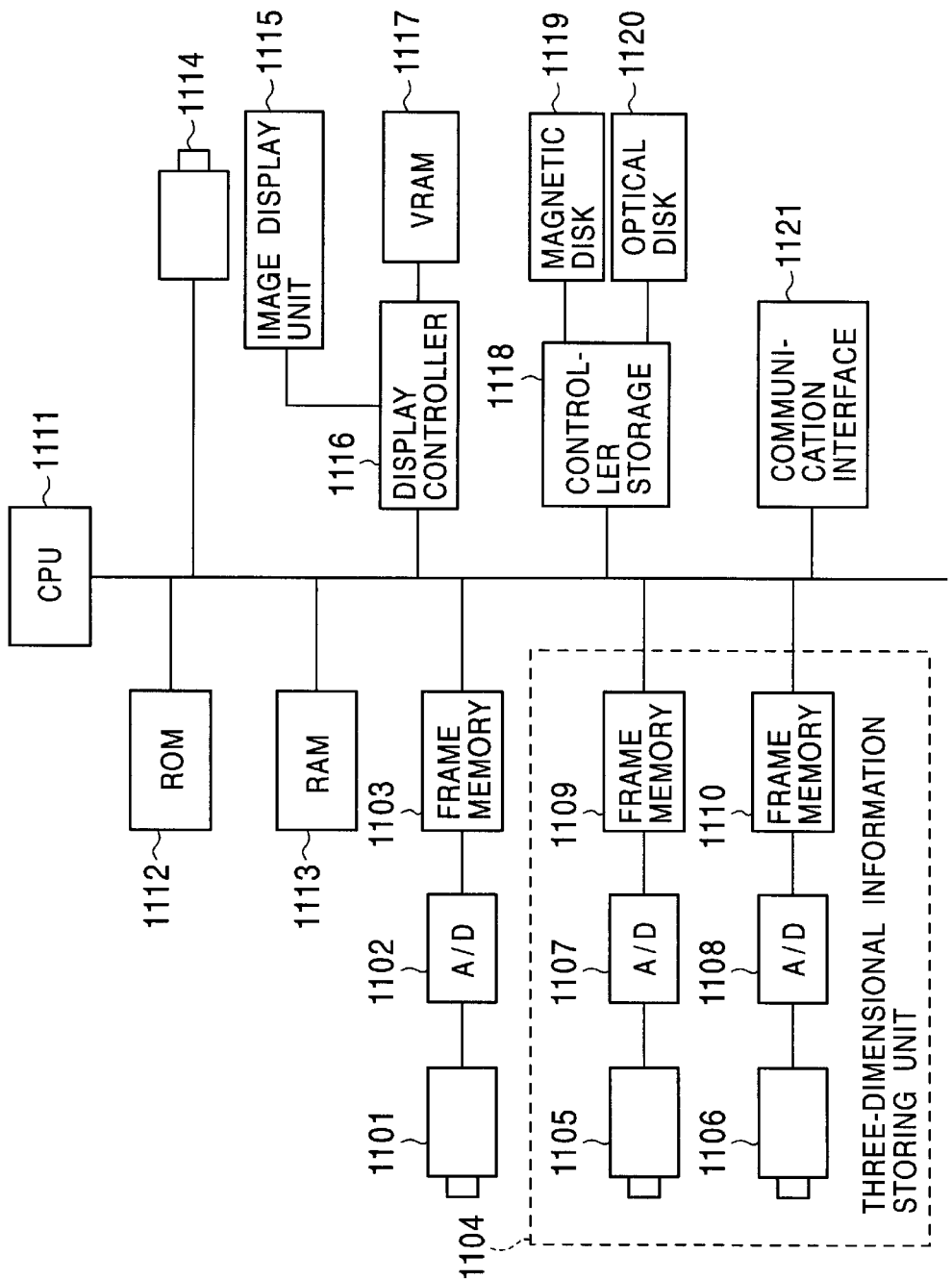
FIG. 11 is a block diagram illustrating a hardware configuration example of the fourth embodiment of the image processing apparatus according to the present invention.

A hardware configuration example for realizing the function block diagram relating to the fourth embodiment of the image processing apparatus according to the present invention shown in FIG. 10, is shown in FIG. 11.

Images taken by the camera 1101 are subjected to analog/digital conversion processing at A/D converting unit 1102, and the digital data of each is stored in the frame memory 1103.

The three-dimensional information obtaining unit 1104 has in the present configuration a single standard camera 1105 and a single reference camera 1106, which are positioned to take the same object from different visual line directions so as to enable three-dimensional information obtaining according to the stereo method described in the first embodiment with reference to FIG. 5. The images taken from the standard camera 1105 and the reference camera 1106 are subjected to analog/digital conversion processing at the A/D converting units 1107 and 1108, and the digital data is stored in the respective frame memory 1109 and 1110.

The CPU 1111 performs generating of various types of information and control processing at the components shown in FIG. 10. As one of these, the CPU 1111 performs generating of the image distance information based on images from a different visual line obtained by the three-dimensional information obtaining device 1104, by the stereo method described in the first embodiment. Three-dimensional information serving as the distance information is obtained with the stereo method, based on the information from the frame memory 1109 and 1110. Also, the CPU 1111 performs the obtaining processing for the fixation point information at the fixation point obtaining unit 1054 shown in FIG. 10. This is performed by obtaining the fixation point for the image display unit 1115 based on the point of view information of the user obtained by the sensor 1114 shown in FIG. 11. This is calculated as the pixel position information "is" of the image display unit 1115. Further, the CPU 1111 performs generating processing of the out-of-focus images at the out-of-focus image generating unit 1056 in FIG. 10. This is performed by following the processing flow shown in FIG. 6 described in the first embodiment.

The ROM 1112 stores permanent program data, for example IPL, self-diagnostic programs (POST), code groups for executing hardware input/output operation (BIOS), and so forth.

The RAM 1113 is writable memory used for the CPU 1111 to load executing program code or for temporarily storing work data. The RAM 1113 is used for storing necessary data and programs in the three-dimensional information generating processes, fixation point information obtaining processes, and out-of-focus image generating process.

The display controller 1116 performs display control of the image display unit 1115. The VRAM 1117 is memory for temporarily storing the display data of the image display unit 1115. The image data taken by the camera 1101 and written to the frame memory 1103 is subjected to out-of-focus image generation by the CPU 1111 based on the three-dimensional information and fixation point information, which is temporarily stored in the VRAM 1117 via the display controller 1116, and supplied to the image display unit 1115. The image display unit 1115 is subjected to out-of-focus image generation processing according to the fixation point position of the user, and thus the image becomes an image closer to actual three-dimensional space observation.

The image display unit 1115 is specifically configured of display means such as CRTs or LCDS. The image processing apparatus according to the present invention necessitates that the image display units be of a configuration capable of displaying images generated by out-of-focus image generation processing in increments of pixels, and thus must be display means such as CRTs or LCDs capable of supporting bitmap display formats.

The storage controller 1118 is for executing access control to a magnetic disk 1119 and optical disk 1120 for example, and is configured so as to access various types of processing programs, virtual image data, or actual image data, etc., recorded in the magnetic disk 1119 and optical disk 1120, and performing image processing based on the accessed data. Incidentally, the image processing based on the image data stored in these storage mediums will be described in the fifth embodiment on.

The communication interface 1121 is a device for connecting to a network by a predetermined communication protocol, TCP/IP for example. Multiple computer systems (hereafter also referred to as "remote systems"; not shown in the drawings) exist on the network. The image processing apparatus according to the present embodiment is capable of transferring an image which has been processed by itself to a remote system via network. Or, supply of image data files or program files can be received from remote systems via network.

Incidentally, in order to actually configure the image processing apparatus according to the present invention, many other hardware components other than those shown in FIG. 11 are necessary. However, these are known to those in the trade, and do not configure the essentials of the present invention, and thus are omitted from the present description. Also, note that the connections between the hardware blocks in the drawings have been represented in abstract manner, in order to avoid the drawings from becoming complicated.

Fifth Embodiment

Figure 12:
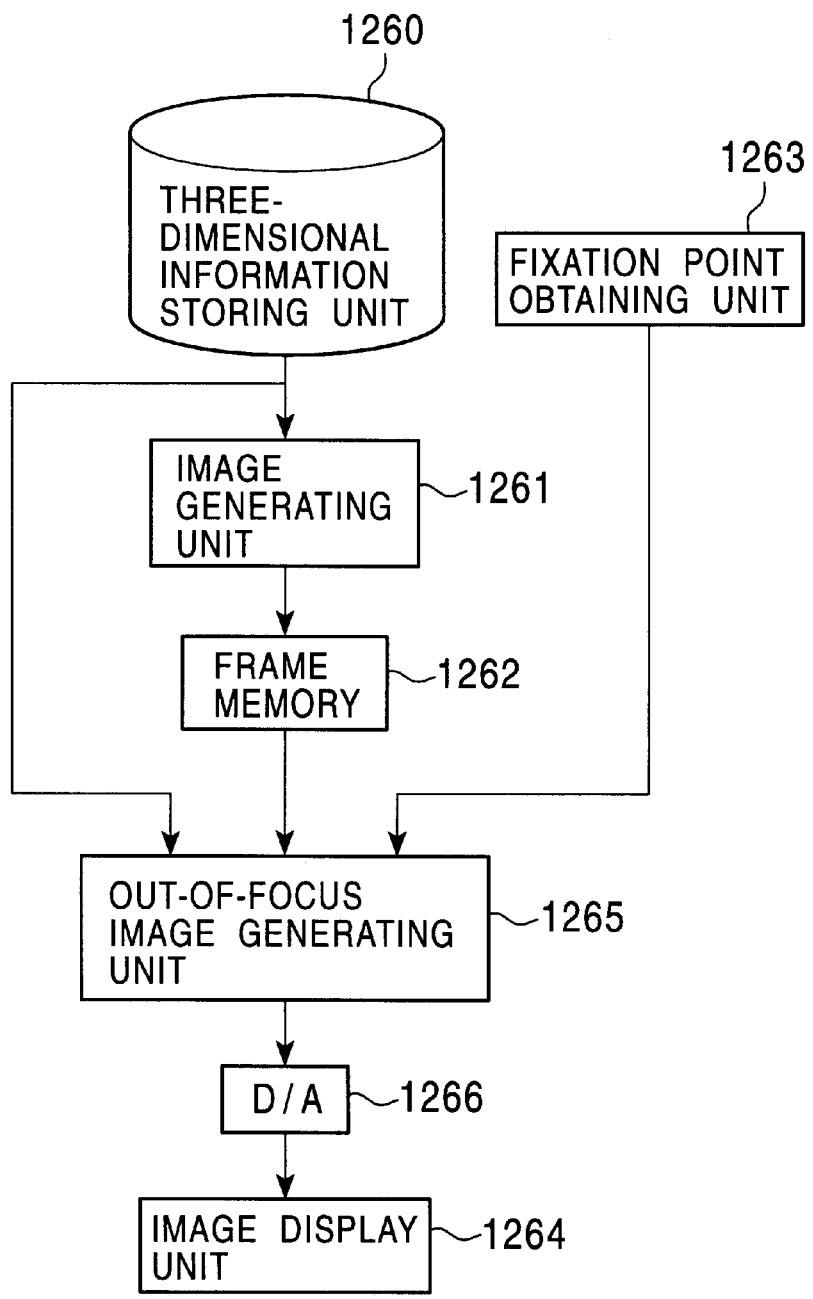
FIG. 12 is a block diagram illustrating the configuration of a fifth embodiment of the image processing apparatus according to the present invention.

FIG. 12 illustrates the configuration of the fifth embodiment of the image processing apparatus according to the present invention. An image is generated at the image generating unit 1261 from the point of view position, i.e., the point of view direction from the user to the image display unit 1264, based on the three-dimensional information stored in the three-dimensional information storing unit 1260. The image generated at the at the image generating unit 1261 is stored in the frame memory 1262.

The fixation point obtaining unit 1263 obtains information regarding at which point on the image display unit 1264 that the user is visually fixed on.

The out-of-focus image generating unit 1265 receives image data from the respective frame memory 1262, and also receives three-dimensional information from the three-dimensional information storing unit 1260 and fixation point position information from the fixation point obtaining unit 1263. The out-of-focus image generating unit 1265 subjects the image data from the frame memory 1262 to out-of-focus image generating processing, based on the three-dimensional information from the three-dimensional information generating unit 1260 and the fixation point position information from the fixation point obtaining unit 1263.

The fixation point obtaining processing of the fixation point obtaining unit 1263, and the out-of-focus image generating processing of the out-of-focus image generating unit 1265, are the same as that of the fourth embodiment.

Stored in the three-dimensional information storing unit 1260 is three-dimensional information prepared beforehand, i.e., the distance information obtained at the three-dimensional information generating unit shown in FIG. 4 in the first embodiment for example, in a manner corresponding to the image data. The distance information stored in the three-dimensional information storing unit 1260 may be stored distance information generated by the stereo method using the above-described standard camera and reference camera. Also, three-dimensional information obtained for each pixel based on evaluation values obtained by the multi-baseline stereo method wherein multiple reference cameras are used may be used as the distance information, or further, distance information generating using methods other than the stereo method may be used, such as a light-section method with slit light, a method using moire, a distance measuring method according to pattern light irradiation, etc.

The out-of-focus image generating unit 1265 executes processing according to the same processing flow shown in FIG. 6 with the first embodiment and generates out-of-focus images, based on the stored data and the fixation point information received from the fixation point obtaining unit, as with the first embodiment.

The image generating unit 1261 generates an image based on the point of view direction to a single image display means, based on the data stored in the three-dimensional information storing unit 1260. The three-dimensional information storing unit 1260 stores data capable of generating images from the point of view position generated in the image generating unit 1261. For example, this may be multiple sets of image data of actual images taken from multiple point of view positions, combinations of distance data calculated from the multiple sets of image data, virtual three-dimensional computer graphics data generated based on computer graphics technology, and so forth.

The image generating unit 1261 generates images from the point of view position based on the real image data, distance data, computer graphics data, combination of real image data and computer graphics data, etc., stored in the three-dimensional information storing unit 1260, and stores this in the frame memory 1262.

The out-of-focus image generating unit 1265 executes out-of-focus image generating processing, and displays the out-of-focus image on the image display unit 1264, via the D/A converting unit 1266, in the same manner as with the first embodiment.

As with the fourth embodiment, this configuration of the fifth embodiment uses a single image display apparatus, and the image displayed on the image display unit 1264 is dynamically subjected to out-of-focus image generating processing wherein the focus is matched for objects and scenes which are user fixation point objects, and for display components having the same distance as fixation point object objects, and objects having a distance which is different to this are subjected to out-of-focus image generating processing. Accordingly, the user can observe the image display unit 1264 with a sensation closer to the real world.

Incidentally, the hardware configuration of the image processing apparatus according to the fifth embodiment is realized in the configuration shown in FIG. 11 described with the fourth embodiment, but with the three-dimensional information obtaining device 1104 omitted from the hardware configuration. In the configuration shown in FIG. 11, the magnetic disk 1119 and optical disk 1120 are equivalent to the three-dimensional information storing unit 1260 in FIG. 12. Incidentally, the three-dimensional information storing unit 1260 is not restricted to the magnetic disk 1119 and optical disk 1120 shown in FIG. 11, and rather may be a magneto-optical disk, or other solid memory, or may be a format wherein data transferred externally via a communication interface is used successively.

Sixth Embodiment

Figure 13:
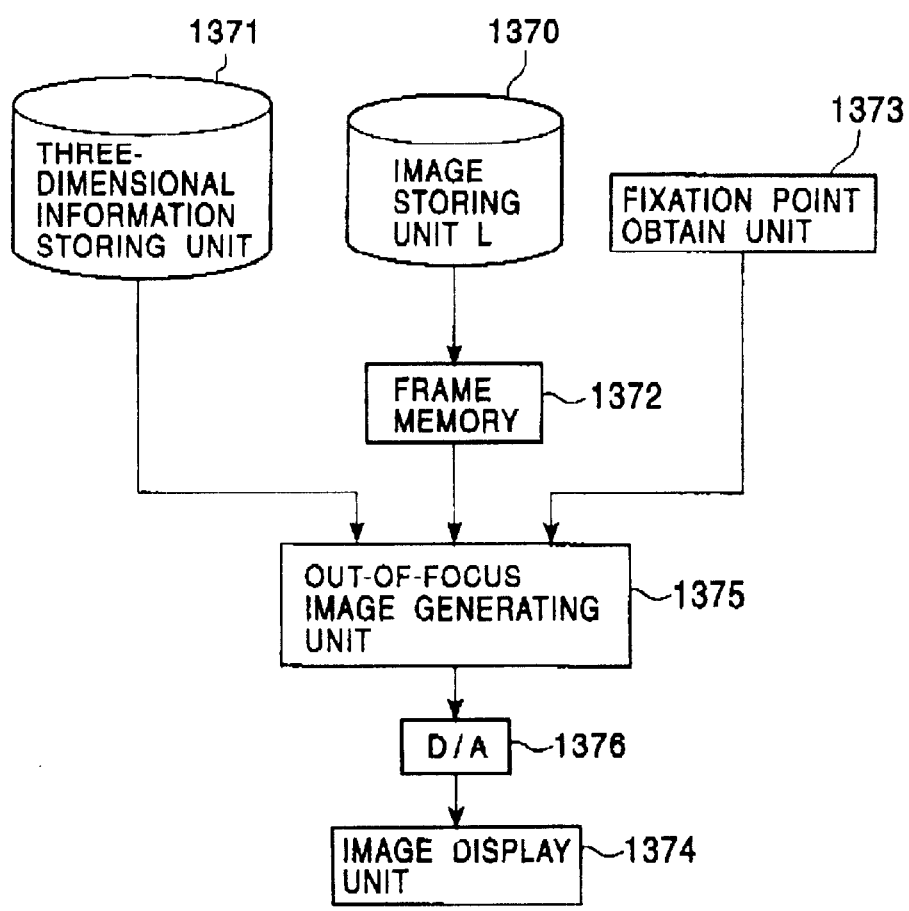
FIG. 13 is a block diagram illustrating the configuration of a sixth embodiment of the image processing apparatus according to the present invention.

FIG. 13 illustrates the sixth embodiment of the image processing apparatus according to the present invention. Images to be provided to the user, i.e., source images, are configured as stored information prepared beforehand in the respective image storing unit 1370. Further, the three-dimensional information storing unit 1371 stores three-dimensional information relating to the image information stored in the image storing unit 1370. This corresponds to the distance information described in the other embodiments, and is distance information obtainable by the stereo method wherein the standard camera and the reference camera are combined.

The image stored in the image storing unit 1370 may be image data of an actual image taken from one point of view position, multiple sets of image data taken from points of view differing from the actual image, image data from the point of view position for virtual three-dimensional computer graphics image data generated by computer graphics technology, or combinations thereof.

The three-dimensional information storing unit 1371 stores distance information relating to the images stored in the image storing unit 1370, and in the event that actual image data is stored in the image storing unit 1370, three-dimensional information corresponding to the real image data is stored, and in the event that computer graphics data is stored therein, three-dimensional information corresponding to the stored computer graphics data is stored.

The distance information stored in the three-dimensional information storing unit 1371 may be obtained by the stereo method based on stored information in the event that image data from two different points of view are stored in the image storing unit 1370, or distance information generated on its own using its own standard camera and reference camera may be stored. Also, three-dimensional information obtained for each pixel based on evaluation values obtained by the multi-baseline stereo method wherein multiple reference cameras are used may be stored. Further, distance information generated using methods other than the stereo method, such as a light-section method with slit light, a method using moire, a distance measuring method according to pattern light irradiation, etc., may be stored.

Image data stored beforehand in the image storing unit 1370 is transferred to the frame memory 1372.

The fixation point obtaining unit 1373 obtains information regarding at which point on the image display unit 1374 that the user is visually fixed on.

The out-of-focus image generating unit 1375 receives image data from the frame memory 1372, and also receives three-dimensional information from the three-dimensional information storing unit 1371 and fixation point position information from the fixation point obtaining unit 1373. The out-of-focus image generating unit 1375 subjects the image data from the frame memory 1372 to out-of-focus image generating processing, based on the three-dimensional information from the three-dimensional information storing unit 1371 and the fixation point position information from the fixation point obtaining unit 1373.

The fixation point obtaining processing of the fixation point obtaining unit 1373, and the out-of-focus image generating processing of the out-of-focus image generating unit 1375, are the same as that of the other embodiments, and generate out-of-focus images according to the processing flow shown in FIG. 6, and also display an out-of focus image on the image display unit 1374 via the D/A converting unit 1376.

As with the fourth embodiment, the configuration of the fifth embodiment uses a single image display apparatus, and the image displayed on the image display unit is dynamically subjected to out-of-focus image generating processing wherein the focus is matched for objects and scenes which are user fixation point object components, and for display components having the same distance as fixation point object components, and components having a distance which is different to this are subjected to out-of-focus image generating processing. Accordingly, the user can observe the image display unit 1374 with a sensation closer to the real world.

Incidentally, the hardware configuration of the image processing apparatus according to the sixth embodiment is realized in the configuration shown in FIG. 11 described with the fourth embodiment with the three-dimensional information obtaining device 1104 omitted from the hardware configuration. In the configuration shown in FIG. 11, the magnetic disk 1119 and optical disk 1120 configure the image storing unit 1370 and the three-dimensional information storing unit 1371, shown in FIG. 13. Incidentally, the information storing units are not restricted to the magnetic disk 1119 and optical disk 1120 shown in FIG. 11, and rather may be a magneto-optical disk, or other solid memory, or may be a format wherein data transferred externally via a communication interface is used successively.

The present invention has been described with reference to particular embodiments. However, it is clearly understood that one in the trade can make various alterations and substitutions without departing from the subject matter of the present invention. In other words, the present invention has been disclosed in the form of examples, and these should not be interpreted restrictively. Also, combinations of the embodiments are also contained within the subject matter of the present invention. The following claims must be taken into account in order to judge the subject matter of the present invention.

As described above, according to the present invention, in an image display configuration wherein images with parallax are shown to a user, objects and scenes at the fixation point distance are handled as focused images, and other objects and scenes are shown as images subjected to out-of focus processing according to the distance difference from the distance of the fixation point, based on the fixation point position information of both left and right eyes, and based on the distance information of the shown image, thereby providing an image processing apparatus, image processing method, and program providing medium capable of yielding an image which has a sensation closer to actual space.

Also, according to the present invention, in an image display configuration wherein one image is shown to a user, objects and scenes at the fixation point distance are handled as focused images, and other objects and scenes are shown as images subjected to out-of focus processing according to the distance difference from the distance of the fixation point, based on the fixation point position information of the eyes of the user, and based on the distance information of the shown image, thereby providing an image processing apparatus, image processing method, and program providing medium capable of yielding an image which has a sensation closer to actual space.

What is claimed is:

1. An image processing apparatus which executes three-dimensional image generation processing, said image processing apparatus comprising:
fixation point obtaining means for obtaining a fixation point position on an image display means; and
out-of-focus image generating means for generating an out-of-focus image based on three-dimensional information relating to a displayed image on said image display means;
wherein said out-of-focus image generating means takes the distance from the point of view of the display component contained in the pixel position corresponding to the fixation point position at said image display means as the standard distance;
wherein said image processing apparatus has a configuration in which out-of-focus image generation processing is performed regarding display components on said image display means at which the difference with said standard distance exceeds a predetermined threshold value; and
wherein out-of-focus image generation processing is performed by said out-of-focus image generating means by changing the luminance of arbitrary pixel "i" using information of pixels in a surrounding area containing the arbitrary pixel "i" based on the difference between said arbitrary pixel "i" and said standard distance, i.e., based on R(is)−R(i), wherein
"is" represents the pixel position of the fixation point on the image display means obtained by said fixation point obtaining means,
R(is) represents the standard distance which is the distance from the point of view of said pixel position "is" obtained based on said three-dimensional information, and
R(i) represents the distance from the point of view of said arbitrary pixel "i" on said image display means.

2. An image processing apparatus according to claim 1, having a configuration wherein the out-of-focus image generation processing at said out-of-focus image generating means is executed as different out-of-focus image generation processing depending on the distance difference which is the difference with said standard distance.

3. An image processing apparatus according to claim 1, having a configuration wherein said out-of-focus image generating means obtains the out-of-focus amount z(i) at the pixel "i" on said display means by the following Expression 1;

Expression 1

$$\zeta(i) = \frac{R(is) - R(i)}{R(is)}$$

wherein
"is" represents the pixel position on the image display means obtained by said fixation point obtaining means,
R(is) represents the standard distance which is the distance from the point of view of the pixel position "is" obtained based on said three-dimensional information, and
R(i) represents the distance from the point of view of the arbitrary pixel "i" on said display means;
and wherein the radius r(i) of the area W stipulated with the pixel "i" as the center is obtained using an arbitrarily settable parameter "a" with the following Expression 2;

Expression 2

$$r(i) = a \cdot \zeta(i)$$

and wherein the luminance value B(i) following the out-of-focus image generation processing is obtained by the following Expression 3;

Expression 3

$$B(i) = \frac{\sum_{j \in w} I(j)}{N}$$

wherein
j represents the pixels contained in the area W,
N represents the number of pixels contained in the area W, and I(i) represents the original luminance value at the pixel "i";

thus executing processing for determining the luminance value B(i) as the luminance value of the pixel "i".

4. An image processing apparatus according to claim 1, comprising:

first image display means for displaying a left-eye image according to parallax, and second image display means for displaying a right-eye image according to parallax; and fixation point obtaining means for obtaining a left-eye fixation point position on said first image display means and a right-eye fixation point position on said second image display means;

wherein said out-of-focus image generating means has a configuration for generating an out-of-focus image based on the three-dimensional information relating to the display image at said first image display means and said second image display means, and taking the distance from the point of view of the display component at the position corresponding to the fixation point position for the left eye at said first image display means as the left eye image standard distance and subjects the displayed image on said first image display means to out-of-focus image generation processing according to the difference between the left eye image and the standard distance, and the distance from the point of view of the display component at the position corresponding to the fixation point position for the right eye at said second image display means as the right eye image standard distance and subjects the displayed image on said second image display means to out-of-focus image generation processing according to the difference between the right eye image and the standard distance.

5. An image processing apparatus according to claim 4, comprising as multiple imaging means for taking images according to parallax, first imaging means for taking visual line images from the visual line of the left eye, and second imaging means for taking visual line images from the visual line of the right eye.

6. An image processing apparatus according to claim 5, comprising three-dimensional information generating means which generates three-dimensional information relating to the displayed images on said first image display means and said second image display means, based on multiple images taken by said first imaging means and said second imaging means.

7. An image processing apparatus according to claim 4, comprising three-dimensional information storing means for storing three-dimensional information relating to the displayed images on said first image display means and said second image display means;

wherein said out-of-focus image generating means has a configuration for executing out-of-focus image generating processing based on the three-dimensional information stored in said three-dimensional information storing means and fixation point information obtained by said fixation point obtaining means.

8. An image processing apparatus according to claim 7, comprising parallax image generating means for generating two different parallax images to provide to said first image display means and said second image display means, based on the stored information in said three-dimensional information storing means;

wherein said out-of-focus image generating means has a configuration for executing out-of-focus image generating processing regarding parallax images generated by said parallax image generating means, based on the three-dimensional information stored in said three-dimensional information storing means and fixation point information obtained by said fixation point obtaining means.

9. An image processing apparatus according to claim 4, comprising image storing means for storing image corresponding to each of the left and right point of view positions.

10. An image processing apparatus according to claim 1; wherein said image display means comprises a single image display means;

and wherein said fixation point obtaining unit has a configuration for obtaining the fixation point average of both left and right eyes, or the fixation point of either the left or right eye, as the fixation point information;

and wherein said out-of focus image generating means determines the distance from the point of view of the display component at the position indicated by the fixation point information received from said fixation point obtaining means as the standard distance, and also subjects the displayed image at said image display means to out-of focus image generating processing according to the difference from said standard distance, based on three-dimensional information regarding the displayed image at said image display means.

11. An image processing apparatus according to claim 10, comprising three-dimensional information obtaining means for obtaining three-dimensional information, wherein said out-of-focus image generating means has a configuration for generating out-of-focus images using the three-dimensional information obtained from said three-dimensional information obtaining means.

12. An image processing apparatus according to claim 10, comprising three-dimensional information storing means for storing three-dimensional information relating to displayed images on said single image display means;

wherein said out-of-focus image generating means has a configuration for executing out-of-focus image generating processing based on the three-dimensional information stored in said three-dimensional information storing means and fixation point information obtained by said fixation point obtaining means.

13. An image processing apparatus according to claim 12, comprising image generating means for generating images based on the visual line direction relating to said single image display means, based on storing information of said three-dimensional information storing means;

wherein said out-of-focus image generating means has a configuration for executing out-of-focus image generating processing regarding images generated by said image generating means, based on the three-dimensional information stored in said three-dimensional information storing means and fixation point information obtained by said fixation point obtaining means.

14. An image processing apparatus according to claim 10, comprising image storing means for storing source images to be provided to said single image display means.

15. An image processing apparatus according to claim 1, wherein said three-dimensional information is three-dimensional information obtained by one of the following methods:

three-dimensional information obtained by applying the stereo method based on multiple image data taken by a standard camera and a reference camera for taking the same object from different visual line directions;

three-dimensional information obtained by the multi base line stereo method using multiple reference cameras;

three-dimensional information obtained by the light-section method with slit light;

three-dimensional information obtained by a method using moire or three-dimensional information obtained by a distance measuring method according to pattern light irradiation.

16. An image processing method which executes three-dimensional image generation processing, said method comprising:

a fixation point obtaining processing step for obtaining a fixation point position on an image display means; and an out-of-focus image generating step for generating an out-of-focus image based on three-dimensional information relating to displayed images on said image display means;

said out-of-focus image generating step comprising:

a step for taking the distance from the point of view of the display component at a position corresponding to the fixation point position at said image display means as the standard distance; and a step for performing said out-of-focus image generation processing regarding display components on said image display means at which the difference with said standard distance exceeds a predetermined threshold value;

and wherein out-of-focus image generating step is performed by changing the luminance value of arbitrary pixel "i" using information of pixels in a surrounding area containing the arbitrary pixel "i" based on the difference between said arbitrary pixel "i" and said standard distance, i.e., based on R(is)−R(i), wherein "is" represents the pixel position of the fixation point on the image display means obtained in said fixation point obtaining step, R(is) represents the standard distance which is the distance from the point of view of said pixel position "is" obtained based on said three-dimensional information, and R(i) represents the distance from the point of view of said arbitrary pixel "i" on said image display means.

17. An image processing method according to claim 16, wherein the out-of-focus image generation processing in said out-of-focus image generating step is executed as different out-of-focus image generation processing depending on the distance difference which is the difference with said standard distance.

18. An image processing method according to claim 16, wherein said out-of-focus image generating step obtains the out-of-focus amount z(i) at the pixel "i" on said display means by the following Expression 4;

Expression 4

$$\zeta(i) = \frac{R(is) - R(i)}{R(is)}$$

wherein

"is" represents the pixel position on the image display means obtained in said fixation point obtaining step, R(is) represents the standard distance which is the distance from the point of view of the pixel position "is" obtained based on said three-dimensional information, and R(i) represents the distance from the point of view of the arbitrary pixel "i";

and wherein the radius r(i) of the area W stipulated with the pixel "i" as the center is obtained using an arbitrarily settable parameter "a" with the following Expression 5;

Expression 5

$$r(i) = a\zeta(i)$$

and wherein the luminance value B(i) following the out-of-focus image generation processing is obtained by the following Expression 6;

Expression 6

$$B(i) = \frac{\sum_{j \in w} I(j)}{N}$$

wherein j represents the pixels contained in the area W,

N represents the number of pixels contained in the area W, and

I(i) represents the original luminance value at the pixel "i";

thus executing processing for determining the luminance value B(i) as the luminance value of the pixel "i".

19. An image processing method according to claim 16, comprising a fixation point obtaining step for obtaining a left-eye fixation point position on a first image display means for displaying a left-eye image according to parallax, and for obtaining a right-eye fixation point position on a second image display means for displaying a right-eye image according to parallax;

said out-of-focus image generating step comprising:

a step for taking the distance from the point of view of the display component at the position corresponding to the fixation point position for the left eye at said first image display means as the standard distance for the left eye image;

a step for subjecting the displayed image on said first image display means to out-of-focus image generation processing according to the difference between the left eye image and the standard distance;

a step for taking the distance from the point of view of the display component at the position corresponding to the fixation point position for the right eye at said second image display means as the standard distance for the right eye image; and a step for subjecting the displayed image on said second image display means to out-of-focus image generation processing according to the difference between the right eye image and the standard distance.

20. An image processing method according to claim 19, comprising:

a step for taking visual line images from the visual line of the left eye with a first imaging means, and for taking visual line images from the visual line of the right eye with a second imaging means; and a three-dimensional information generating step for generating three-dimensional information relating to the displayed images on said first image display means and said second image display means, based on multiple images taken by said first imaging means and said second imaging means.

21. An image processing method according to claim 19, wherein said out-of-focus image generating step executes out-of-focus image generating processing, based on the three-dimensional information stored in the three-dimensional information storing means storing three-dimensional information relating to the displayed image, at said first image display means and said second image display means, and fixation point information obtained in said fixation point obtaining step.

22. An image processing method according to claim 21, comprising a parallax image generating step for generating two different parallax images to provide to said first image display means and said second image display means, based on the stored information in said three-dimensional information storing means;

wherein said out-of-focus image generating step executes out-of-focus image generating processing regarding parallax images generated in said parallax image generating step, based on the three-dimensional information stored in said three-dimensional information storing means and fixation point information obtained in said fixation point obtaining step.

23. An image processing method according to claim 16, wherein said image display means comprises a single image display means;

and wherein said fixation point obtaining step obtains the fixation point average value of both left and right eyes, or the fixation point of either the left or right eye, as the fixation point information;

and wherein said out-of focus image generating step comprises:

a step for determining the distance from the point of view of the display component at the position indicated by the fixation point information obtained in said fixation point obtaining step as the standard distance, based on three-dimensional information relating to the displayed image on said image display means;

and a step for subjecting the displayed image at said image display means to out-of focus image generating processing according to the difference from said standard distance.

24. An image processing method according to claim 23, further comprising a three-dimensional information obtaining step for obtaining three-dimensional information, wherein said out-of-focus image generating step generates out-of-focus images using the three-dimensional information obtained in said three-dimensional information obtaining step.

25. An image processing method according to claim 24, comprising an image generating step for generating images based on the visual line direction relating to said single image display means, based on storing information of said three-dimensional information storing means;

wherein said out-of-focus image generating step executes out-of-focus image generating processing regarding images generated in said image generating step, based on the three-dimensional information stored in said three-dimensional information storing means and fixation point information obtained in said fixation point obtaining step.

26. A program providing medium which tangibly provides computer programs for performing processing on a computer system to execute three-dimensional image processing, said computer program comprising:

a fixation point obtaining step for obtaining a fixation point position on an image display means; and an out-of-focus image generating step for generating an out-of-focus image based on three-dimensional information relating to displayed images on said image display means;

said out-of-focus image generating step comprising:

a step for taking the distance from the point of view of the display component at the position corresponding to the fixation point position at said image display means as the standard distance; and a step for performing said out-of-focus image generation processing regarding display components on said image display means at which the difference with said standard distance exceeds a predetermined threshold value and wherein said out-of-focus generation processing is performed by changing the luminance of arbitrary pixel "i" using information of pixels in a surrounding area containing the arbitrary pixel "i" based on the difference between said arbitrary pixel "i" and said standard distance, i.e., based on R(is)–R(i), wherein "is" represents the pixel position of the fixation point on the image display means obtained by said fixation point obtaining step, R(is) represents the standard distance which is the distance from the point of view of said pixel position "is" obtained based on said three-dimensional information, and R(i) represents the distance from the point of view of said arbitrary pixel "i" on said image display means.

27. An image processing apparatus which executes three-dimensional image generation processing, said image processing apparatus comprising:

fixation point obtaining means for obtaining a fixation point position on an image display means; and out-of-focus image generating means for generating an out-of-focus image based on three-dimensional information relating to a displayed image on said image display means;

wherein said out-of-focus image generating means takes the distance from the point of view of the display component contained in the pixel position corresponding to the fixation point position at said image display means as the standard distance;

and wherein said image processing apparatus has a configuration in which out-of-focus image generation processing is performed regarding display components on said image display means at which the difference with said standard distance exceeds a predetermined threshold value;

wherein said out-of-focus image generating means obtains the out-of-focus amount z(i) at the pixel "i" on said display means by the following Expression 1;

Expression 1

$$\zeta(i) = \frac{R(is) - R(i)}{R(is)}$$

wherein

"is" represents the pixel position on the image display means obtained by said fixation point obtaining means, R(is) represents the standard distance which is the distance from the point of view of the pixel position "is" obtained based on said three-dimensional information, and R(i) represents the distance from the point of view of the arbitrary pixel "i" on said display means;

and wherein the radius r(i) of the area W stipulated with the pixel "i" as the center is obtained using an arbitrarily settable parameter "a" with the following Expression 2;

Expression 2

$$r(i) = a\zeta(i)$$

and wherein the luminance value B(i) following the out-of-focus image generation processing is obtained by the following Expression 3;

Expression 3

$$B(i) = \frac{\sum_{j \in w} I(j)}{N}$$

wherein j represents the pixels contained in the area W,

N represents the number of pixels contained in the area W, and

I(i) represents the original luminance value at the pixel "i";

thus executing processing for determining the luminance value B(i) as the luminance value of the pixel "i".

28. An image processing apparatus according to claim 27, having a configuration wherein the out-of-focus image generation processing at said out-of-focus image generating means is executed as different out-of-focus image generation processing depending on the distance difference which is the difference with said standard distance.

29. An image processing apparatus according to claim 27, comprising:

first image display means for displaying a left-eye image according to parallax, and second image display means for displaying a right-eye image according to parallax; and fixation point obtaining means for obtaining a left-eye fixation point position on said first image display means and a right-eye fixation point position on said second image display means;

wherein said out-of-focus image generating means has a configuration for generating an out-of-focus image based on the three-dimensional information relating to the display image at said first image display means and said second image display means, and taking the distance from the point of view of the display component at the position corresponding to the fixation point position for the left eye at said first image display means as the left eye image standard distance and subjects the displayed image on said first image display means to out-of-focus image generation processing according to the difference between the left eye image and the standard distance, and the distance from the point of view of the display component at the position corresponding to the fixation point position for the right eye at said second image display means as the right eye image standard distance and subjects the displayed image on said second image display means to out-of-focus image generation processing according to the difference between the right eye image and the standard distance.

30. An image processing method which executes three-dimensional image generation processing, said method comprising:

a fixation point obtaining processing step for obtaining a fixation point position on an image display means; and an out-of-focus image generating step for generating an out-of-focus image based on three-dimensional information relating to displayed images on said image display means;

said out-of-focus image generating step comprising:

a step for taking the distance from the point of view of the display component at a position corresponding to the fixation point position at said image display means as the standard distance; and a step for performing said out-of-focus image generation processing regarding display components on said image display means at which the difference with said standard distance exceeds a predetermined threshold value;

and wherein said out-of-focus image generating step obtains the out-of-focus amount z(i) at the pixel "i" on said display means by the following Expression 4;

Expression 4

$$\zeta(i) = \frac{R(is) - R(i)}{R(is)}$$

wherein

"is" represents the pixel position on the image display means obtained in said fixation point obtaining step, R(is) represents the standard distance which is the distance from the point of view of the pixel position "is" obtained based on said three-dimensional information, and R(i) represents the distance from the point of view of the arbitrary pixel "i";

and wherein the radius r(i) of the area W stipulated with the pixel "i" as the center is obtained using an arbitrarily settable parameter "a" with the following Expression 5;

Expression 5

$$r(i) = a\zeta(i)$$

and wherein the luminance value B(i) following the out-of-focus image generation processing is obtained by the following Expression 6;

Expression 6

$$B(i) = \frac{\sum_{j \in w} I(j)}{N}$$

wherein j represents the pixels contained in the area W,

N represents the number of pixels contained in the area W, and

I(i) represents the original luminance value at the pixel "i";

thus executing processing for determining the luminance value B(i) as the luminance value of the pixel "i".

31. An image processing method according to claim 30, wherein the out-of-focus image generation processing in said out-of-focus image generating step is executed as different out-of-focus image generation processing depending on the distance difference which is the difference with said standard distance.

32. An image processing method according to claim 30, comprising a fixation point obtaining step for obtaining a left-eye fixation point position on a first image display means for displaying a left-eye image according to parallax, and for obtaining a right-eye fixation point position on a second image display means for displaying a right-eye image according to parallax;

said out-of-focus image generating step comprising:

a step for taking the distance from the point of view of the display component at the position corresponding to the fixation point position for the left eye at said first image display means as the standard distance for the left eye image;

a step for subjecting the displayed image on said first image display means to out-of-focus image generation processing according to the difference between the left eye image and the standard distance;

a step for taking the distance from the point of view of the display component at the position corresponding to the fixation point position for the right eye at said second image display means as the standard distance for the right eye image; and a step for subjecting the displayed image on said second image display means to out-of-focus image generation processing according to the difference between the right eye image and the standard distance.

33. A program providing medium which tangibly provides computer programs for performing processing on a computer system to execute three-dimensional image processing, said computer program comprising:

a fixation point obtaining step for obtaining a fixation point position on an image display means; and an out-of-focus image generating step for generating an out-of-focus image based on three-dimensional information relating to displayed images on said image display means;

said out-of-focus image generating step comprising:

a step for taking the distance from the point of view of the display component at the position corresponding to the fixation point position at said image display means as the standard distance; and a step for performing said out-of-focus image generation processing regarding display components on said image display means at which the difference with said standard distance exceeds a predetermined threshold value;

wherein an out-of-focus amount z(i) at the pixel "i" is obtained on said image display means by the following Expression 1;

Expression 1

$$\zeta(i) = \frac{R(is) - R(i)}{R(is)}$$

wherein

"is" represents the pixel position on the image display means,

R(is) represents the standard distance which is the distance from the point of view of the pixel position "is" obtained based on said three-dimensional information, and R(i) represents the distance from the point of view of the arbitrary pixel "i" on said image display means;

and wherein the radius r(i) of the area W stipulated with the pixel "i" as the center is obtained using an arbitrarily settable parameter "a" with the following Expression 2;

Expression 2

$$r(i) = a\zeta(i)$$

and wherein the luminance value B(i) following the out-of-focus image generation processing is obtained by the following Expression 3;

Expression 3

$$B(i) = \frac{\sum_{j \in w} I(j)}{N}$$

wherein j represents the pixels contained in the area W,

N represents the number of pixels contained in the area W, and

I(i) represents the original luminance value at the pixel "i";

thus executing processing for determining the luminance value B(i) as the luminance value of the pixel "i".

* * * * *